(12) United States Patent
Smith et al.

(10) Patent No.: US 12,495,947 B2
(45) Date of Patent: Dec. 16, 2025

(54) CONTROL OF CLEANING MACHINE CYCLES USING MACHINE VISION

(71) Applicant: Ecolab USA Inc., St. Paul, MN (US)

(72) Inventors: Conor Sylvester Smith, Saint Louis Park, MN (US); Paul Dominic Christian, Apple Valley, MN (US); Elizabeth Minhee Han, St. Paul, MN (US); Paul R. Kraus, Apple Valley, MN (US); Rachel Marie McGinness, Rosemount, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 18/185,194

(22) Filed: Mar. 16, 2023

(65) Prior Publication Data

US 2023/0218137 A1    Jul. 13, 2023

Related U.S. Application Data

(63) Continuation of application No. 17/018,363, filed on Sep. 11, 2020, now Pat. No. 11,627,861.
(Continued)

(51) Int. Cl.
*A47L 15/46*    (2006.01)
*A47L 15/00*    (2006.01)
*A47L 15/42*    (2006.01)

(52) U.S. Cl.
CPC ....... *A47L 15/4295* (2013.01); *A47L 15/0026* (2013.01); *A47L 15/0028* (2013.01);
(Continued)

(58) Field of Classification Search
None
See application file for complete search history.

(56) References Cited

U.S. PATENT DOCUMENTS

| 4,735,219 A | 4/1988 | Seeland |
| 6,615,850 B1 | 9/2003 | Hornung |
| (Continued) | | |

FOREIGN PATENT DOCUMENTS

| CN | 101460085 A | 6/2009 |
| CN | 101961237 A | 2/2011 |
| (Continued) | | |

OTHER PUBLICATIONS

Translation of JPH0663279 by Ioku, published Mar. 8, 1994.*
(Continued)

*Primary Examiner* — Kaj K Olsen
*Assistant Examiner* — Ryan L Coleman
(74) *Attorney, Agent, or Firm* — Shumaker & Sieffert, P.A.

(57) ABSTRACT

Image classification is used to dynamically control one or more wash parameters in an automated cleaning machine. An imaging device installed in the wash chamber of the cleaning machine captures one or more image(s) of articles to be cleaned at various times throughout a cleaning process. A computing device analyzes the captured image(s) to classify the images as to an article type and a rack volume. Based on the article type classification and the rack volume, the computing device dynamically controls one or more parameters of the cleaning process to achieve a satisfactory cleaning and/or sanitizing result.

15 Claims, 7 Drawing Sheets

Related U.S. Application Data

(60) Provisional application No. 62/899,592, filed on Sep. 12, 2019.

(52) U.S. Cl.
CPC ........... *A47L 15/0047* (2013.01); *A47L 15/46* (2013.01); *A47L 2401/04* (2013.01); *A47L 2501/30* (2013.01)

(56) References Cited

U.S. PATENT DOCUMENTS

| | | | |
|---|---|---|---|
| 6,622,754 | B1 | 9/2003 | Roth et al. |
| 7,695,568 | B2 | 4/2010 | Gaus |
| 9,289,107 | B2 | 3/2016 | Ellingson et al. |
| 11,627,861 | B2 | 4/2023 | Smith et al. |
| 11,666,198 | B2 | 6/2023 | Han et al. |
| 2007/0181162 | A1 | 8/2007 | Classen et al. |
| 2009/0151751 | A1 | 6/2009 | Bragg |
| 2010/0205819 | A1 | 8/2010 | Ashrafzadeh et al. |
| 2011/0108073 | A1 | 5/2011 | Tameishi |
| 2011/0209729 | A1 | 9/2011 | Beaudet et al. |
| 2012/0138092 | A1 | 6/2012 | Ashrafzadeh et al. |
| 2014/0041688 | A1 | 2/2014 | Maennle et al. |
| 2014/0041695 | A1* | 2/2014 | Ellingson ............ A47L 15/0047 134/105 |
| 2016/0324396 | A1* | 11/2016 | Hong ................... A47L 15/16 |
| 2017/0119232 | A1* | 5/2017 | Ugel ................. A47L 15/0047 |
| 2018/0092508 | A1* | 4/2018 | Thiyagarajan .......... A47L 15/50 |
| 2018/0330338 | A1 | 11/2018 | Holden et al. |
| 2019/0244375 | A1 | 8/2019 | Choi et al. |
| 2019/0261828 | A1 | 8/2019 | Gaus et al. |
| 2019/0298143 | A1 | 10/2019 | Haidacher et al. |
| 2019/0365197 | A1 | 12/2019 | Maddux |
| 2020/0301382 | A1 | 9/2020 | Fawaz et al. |
| 2020/0397216 | A1 | 12/2020 | Fawaz et al. |
| 2021/0127939 | A1 | 5/2021 | Hofmann et al. |
| 2021/0161355 | A1 | 6/2021 | Rahn et al. |
| 2021/0324561 | A1 | 10/2021 | Kim et al. |
| 2021/0369076 | A1 | 12/2021 | McGinness et al. |
| 2022/0095879 | A1 | 3/2022 | Ellingson |
| 2022/0104680 | A1 | 4/2022 | Han et al. |

FOREIGN PATENT DOCUMENTS

| | | | |
|---|---|---|---|
| CN | 107421918 | A | 12/2017 |
| CN | 107485356 | A | 12/2017 |
| CN | 107729816 | A | 2/2018 |
| CN | 104668252 | B | 1/2019 |
| CN | 109620078 | A | 4/2019 |
| CN | 110367898 | A | 10/2019 |
| CN | 111870205 | A | 11/2020 |
| DE | 102005033345 | A1 | 1/2007 |
| DE | 102008042290 | A1 | 3/2010 |
| DE | 102018108775 | A1 | 10/2019 |
| EP | 0341766 | A2 | 11/1989 |
| EP | 1272093 | A2 | 1/2003 |
| EP | 1690924 | A1 | 8/2006 |
| EP | 1887443 | A1 | 2/2008 |
| EP | 2497404 | A1 | 9/2012 |
| EP | 3088593 | A1 | 11/2016 |
| JP | H02274289 | A | 11/1990 |
| JP | 05115418 | A | 5/1993 |
| JP | H0663279 | * | 3/1994 |
| JP | 2000316783 | A | 11/2000 |
| JP | 2003038888 | A | 2/2003 |
| JP | 2004261439 | A | 9/2004 |
| JP | 2005342143 | A | 12/2005 |
| JP | 2010036023 | A | 2/2010 |
| JP | 2015008914 | A | 1/2015 |
| JP | 2015504708 | A | 2/2015 |
| JP | 2016193169 | A | 11/2016 |
| JP | 2018068862 | A | 5/2018 |
| KR | 102119076 | B1 | 6/2020 |
| WO | 0178573 | A2 | 10/2001 |
| WO | 2006002123 | A1 | 1/2006 |
| WO | 2006097294 | A1 | 9/2006 |
| WO | 2013090443 | A1 | 6/2013 |
| WO | 2015080965 | A1 | 6/2015 |
| WO | 2015167574 | A1 | 11/2015 |

OTHER PUBLICATIONS

Advisory Action from U.S. Appl. No. 17/193,189 dated Aug. 3, 2023, 3 pp.
Response to Office Action mailed May 26, 2023, from U.S. Appl. No. 17/193,189, filed Jul. 26, 2023, 14 pp.
"NSF/ANSI 3—2017-Commercial Warewashing Equipment," NSF International, ANSI Standard, Apr. 11, 2017, 42 pp.
"Two-Class Logistic Regression," retrieved from https://docs.microsoft.com/en-us/azure/machine-learning/studio-module-reference/two-class-logistic-regression, May 6, 2019, 7 pp.
Brownlee, "A Tour of Machine Learning Algorithms," machinelearningmastery.com, Aug. 14, 2020, 11 pp.
International Preliminary Report on Patentability from International Application No. PCT/US2020/050381, dated Mar. 24, 2022, 11 pp.
International Search Report and Written Opinion of International Application No. PCT/US2020/050381, mailed Jan. 15, 2021, 19 pp.
Invitation to Pay Additional Fees and, Where Applicable, Protest Fee, Provisional Opinion and Partial Search from International Application No. PCT/US2020/050381, mailed Nov. 16, 2020, 14 pp.
Machine Translation of CN 107729816 by Shan et al., published Feb. 23, 2018.
Narkhede, "Understanding AUC—ROC Curve," towardsdatascience.com, Jun. 26, 2018, 7 pp.
Narkhede, "Understanding Confusion Matrix," towardsdatascience.com, May 9, 2018, 6 pp.
Patel, "Machine Learning Algorithm Overview," medium.com, Jul. 21, 2018, 10 pp.
Prosecution History from U.S. Appl. No. 17/018,363, dated Dec. 16, 2021 through Mar. 16, 2023, 72 pp.
Prosecution History from U.S. Appl. No. 17/193,189, dated May 19, 2022 through May 26, 2023, 88 pp.
Prosecution History from U.S. Appl. No. 17/193,507, dated Oct. 21, 2022 through Apr. 28, 2023, 39 pp.
Response to Communication Pursuant to Rules 161(1) and 162 EPC dated Apr. 21, 2022, from counterpart European Application No. 20780514.4, filed Oct. 20, 2022, 18 pp.
Saslow, "Collinearity—What it Means, Why its Bad, and How Does it Affect Other Models," medium.com, Jun. 11, 2018, 5 pp.
Shung, "Accuracy, Precision, Recall or F1?," towardsdatascience.com, Mar. 15, 2018, 7 pp.
Singh, "Model-Based Feature Importance," towardsdatascience.com, Jan. 3, 2019, 7 pp.
U.S. Appl. No. 18/307,380, filed Apr. 26, 2023, naming inventors Han et al.
Youtube, "Regularization Part 1: Ridge (L2) Regression," retrieved from https://www.youtube.com/watch?app=desktop&v=Q81RR3yKn30&t=3s, Sep. 24, 2018, 1 pp.
Youtube, "Regularization Part 2: Lasso (L1) Regression," Retrieved from https://www.youtube.com/watch?app=desktop&v=NGf0voTMIcs, Oct. 1, 2018, 1 pp.
DE102018108775 English translation, accessed on Sep. 2023. (Year: 2019).
Notice of Allowance from U.S. Appl. No. 17/193,189 dated Sep. 27, 2023, 14 pp.
Office Action from U.S. Appl. No. 17/193,314 dated Sep. 13, 2023, 21 pp.
Office Action from counterpart Canadian Application No. 3,152,532 dated Feb. 6, 2024, 4 pp.
Response to Office Action mailed Sep. 13, 2023, from U.S. Appl. No. 17/193,314, filed Dec. 13, 2023, 13 pp.
U.S. Appl. No. 18/398,859, filed Dec. 28, 2023, by McGinness et al.
Communication pursuant to Article 94(3) EPC from counterpart European Application No. 20780514.4 dated Sep. 5, 2024, 5 pp.

(56) References Cited

OTHER PUBLICATIONS

Office Action, and translation thereof, from counterpart Chinese Application No. 202080058131.9 dated Sep. 2, 2024, 7 pp.
Response to Office Action dated Feb. 6, 2024, from counterpart Canadian Application No. 3,152,532 filed Jun. 5, 2024, 31 pp.
Final Office Action from U.S. Appl. No. 17/193,314 dated Mar. 27, 2024, 19 pp.
Corrected Notice of Allowance from U.S. Appl. No. 18/307,380 dated Dec. 20, 2024, 5 pp.
Notice of Allowance from U.S. Appl. No. 18/307,380 dated Dec. 18, 2024, 9 pp.
Response to Communication pursuant to Article 94(3) EPC dated Sep. 5, 2024, from counterpart European Application No. 20780514.4 filed Jan. 3, 2025, 18 pp.
First Examination Report from counterpart Australian Application No. 2020344611 dated May 19, 2025, 3 pp.
Office Action from counterpart Application No. BR 11 2022 002995 0 dated Feb. 25, 2025, 6 pp. Translation Attached.
Second Office Action from counterpart Canadian Application No. 3,152,532 dated Mar. 10, 2025, 3 pp.
Second Office Action from counterpart Chinese Application No. 202080058131.9 dated May 1, 2025, 15 pp.
Response to Response to First Examination Report dated May 19, 2025, from counterpart Australian Application No. 2020344611 filed Aug. 18, 2025, 30 pp.
Response to Second Office Action dated Mar. 10, 2025, from counterpart Canadian Application No. 3,152,532 filed Jun. 26, 2025, 23 pp.
Third Office Action, and translation thereof, from counterpart Chinese Application No. 202080058131.9 dated Jul. 8, 2025, 16 pp.

\* cited by examiner

| Cycle ID | Ware Amount | Ware Weight (g) | Sump Starting Temperature °F (Max) | Sump Min °F | Sump Temperature Drop °F |
|---|---|---|---|---|---|
| 1 | 3 plates | 1575.6 | 166.76 | 161.8 | 4.96 |
| 2 | 3 plates | 1575.6 | 176.946 | 166.703 | 10.243 |
| 3 | 3 plates | 1575.6 | 181.525 | 166.623 | 14.902 |
| 4 | 3 plates | 1575.6 | 172.15 | 165.353 | 6.797 |
| 5 | 3 plates | 1575.6 | 181.503 | 167.321 | 14.582 |
| 6 | 3 plates | 1575.6 | 175.9768 | 165.66 | 10.3168 |
| 7 | full rack | 12270.14 | 147.309 | 131.453 | 15.856 |
| 8 | full rack | 12270.14 | 177.462 | 150.725 | 26.737 |
| 9 | full rack | 12270.14 | 177.064 | 152.393 | 24.671 |
| 10 | full rack | 12270.14 | 179.309 | 156.623 | 22.586 |
| 11 | full rack | 12270.14 | 154.636 | 136.179 | 18.457 |
| 12 | full rack | 12270.14 | 168.359 | 143.063 | 24.296 |
| 13 | full rack | 12270.14 | 167.0131667 | 144.9126667 | 22.1005 |

FIG. 8

CONTROL OF CLEANING MACHINE CYCLES USING MACHINE VISION

This application is a continuation of U.S. patent application Ser. No. 17/018,363, filed Sep. 11, 2020, which claims the benefit of U.S. Provisional Application No. 62/899,592, titled, "CONTROL OF CLEANING MACHINE CYCLES USING MACHINE VISION," filed Sep. 12, 2019, the entire content of each of which is incorporated herein by reference.

BACKGROUND

Automated cleaning machines are used in restaurants, healthcare facilities, and other locations to clean, disinfect, and/or sanitize various articles. In a restaurant or food processing facility, automated cleaning machines (e.g., ware wash machines or dish machines) may be used to clean food preparation and eating articles, such as dishware, glassware, pots, pans, utensils, food processing equipment, and other items. In general, articles to be cleaned are placed on a rack and provided to a wash chamber of the automated cleaning machine. In the chamber, one or more cleaning products and/or rinse agents are applied to the articles during a cleaning process. The cleaning process may include one or more wash phases and one or more rinse phases. At the end of the cleaning process, the rack is removed from the wash chamber. Water temperature, water pressure, water quality, concentration of the chemical cleaning and/or rinse agents, duration of the wash and/or rinse cycles and other factors may impact the efficacy of a cleaning process.

SUMMARY

In general, the disclosure is directed to systems and/or methods that analyze one or more images of articles to be cleaned to control a cleaning process of an automated cleaning machine. According to the disclosure, an imaging device compatible with the environment within the wash chamber of an automated cleaning machine captures one or more image(s) of articles to be cleaned. A computing device analyzes the captured image(s) to extract information about the articles. For example, the computing device may analyze the captured image(s) based on a classification model to classify an article type and/or to assign a rack volume corresponding to the articles represented in the captured image. The computing device may also determine a soil level of the articles represented in the captured image(s). The information may be used to control one or more parameters of the cleaning process (e.g., the length of the wash and/or rinse cycle(s), the wash and/or rinse water temperature(s), the detergent concentration, etc.) in order to achieve a satisfactory cleaning and/or sanitizing result for each individual rack. The computing device may also analyze the captured image(s) to extract information about rewash frequency, ware material type, and/or other relevant information regarding the articles to be cleaned.

The system may further correlate rack volume to an amount of energy needed to achieve adequate sanitization of the articles in a rack. In this way, for each individual rack, the system may determine whether sufficient heat energy has been transferred to the surface of the wares to achieve adequate sanitization of the wares based the rack volume.

In one example, the disclosure is directed to a system comprising at least one imaging device that captures a pre-wash image of articles to be cleaned by an associated cleaning process in a wash chamber of a cleaning machine; at least one processor; and a storage device comprising instructions executable by the at least one processor to analyze the pre-wash image to classify the articles as belonging to one of a plurality of article types; and determine one or more parameters for the associated cleaning process based on the classified one of the plurality of article types.

In some examples, the at least one imaging device may further captures a post-wash image of the articles after completion of the associated cleaning process, and the storage device may further comprise instructions executable by the at least one processor to analyze the post-wash image to determine an amount of soil remaining on the articles after completion of the wash process; determine an extended wash cycle time for the associated cleaning process based on the amount of soil remaining; and initiate execution of an extended wash cycle by the cleaning machine having a wash cycle duration corresponding to the extended wash cycle time.

The storage device may further comprise instructions executable by the at least one processor to determine an extended rinse cycle time for the associated cleaning process based on the amount of soil remaining; and initiate execution of the extended wash cycle by the cleaning machine having a wash cycle duration corresponding to the extended wash cycle time and a rinse cycle duration corresponding to the extended rinse cycle time.

The storage device may further comprise instructions executable by the at least one processor to analyze the pre-wash image to assign one of a plurality of rack volumes corresponding to a relative fullness of a rack on which the articles are supported in the wash chamber; and determine the one or more parameters for the associated cleaning process based on the assigned one of the plurality of rack volumes.

The storage device may further include instructions executable by the at least one processor to initiate a wash cycle of the cleaning machine having a wash cycle duration setting based on the classified one of the plurality of article types and the assigned rack volume.

In some examples, the storage device may further store one or more characteristic sump temperature variations, each characteristic sump temperature variation corresponding to a different one of a plurality of ware materials. The storage device may further comprise instructions executable by the at least one processor to receive sump temperature information throughout a specified portion of the cleaning process; compare the received sump temperature information with the one or more stored characteristic sump temperature variations; identify a corresponding one of the plurality of ware materials based on the comparison; and determine the one or more wash cycle parameters based on the identified one of the plurality of ware materials.

In some examples, the storage device may further comprise instructions executable by the at least one processor to analyze a post-wash image of the articles to determine whether the articles are represented in one or more images associated with a previous cleaning process.

In another example, the disclosure is directed to a method comprising capturing, by an imaging device, a pre-wash image of articles to be cleaned by an associated cleaning process in a wash chamber of a cleaning machine; analyzing the pre-wash image to classify the articles as belonging to one of a plurality of article types; and determining one or more parameters for the associated cleaning process based on the classified one of the plurality of article types.

The method may further comprise capturing, by the imaging device, a post-wash image of the articles after completion of the associated cleaning process; analyzing the post-wash image to determine an amount of soil remaining on the articles after completion of the wash process; determining an extended wash cycle time for the associated cleaning process based on the amount of soil remaining; and initiating execution of an extended wash cycle by the cleaning machine having a wash cycle duration corresponding to the extended wash cycle time. The method may further comprise determining an extended rinse cycle time for the associated cleaning process based on the amount of soil remaining; and initiating execution of the extended wash cycle by the cleaning machine having a wash cycle duration corresponding to the extended wash cycle time and a rinse cycle duration corresponding to the extended rinse cycle time.

The method may further include analyzing the pre-wash image to assign one of a plurality of rack volumes corresponding to a relative fullness of a rack on which the articles are supported in the wash chamber; and determining the one or more parameters for the associated cleaning process based on the assigned one of the plurality of rack volumes.

The method may further include initiating a wash cycle of the cleaning machine having a wash cycle duration setting based on the classified one of the plurality of article types and the assigned rack volume.

The method may further include storing one or more characteristic sump temperature variations, each characteristic sump temperature variation corresponding to a different one of a plurality of ware materials. The method may further include receiving sump temperature information throughout a specified portion of the cleaning process; comparing the received sump temperature information with the one or more stored characteristic sump temperature variations; identifying a corresponding one of the plurality of ware materials based on the comparison; and determining the one or more wash cycle parameters based on the identified one of the plurality of ware materials.

In another example, the disclosure is directed to a system configured to control a cleaning process for cleaning articles in the wash chamber of a cleaning machine, the articles comprising one of a plurality of ware materials, comprising: at least one processor; and a storage device comprising one or more characteristic sump temperature variations, each characteristic sump temperature variation corresponding to a different one of the plurality of ware materials, the storage device further comprising instructions executable by the at least one processor to: receive sump temperature information at one or more specified times during the cleaning process; compare the received sump temperature information with the one or more stored characteristic sump temperature variations; identify one of the plurality of ware materials corresponding to the articles based on the comparison; and control one or more wash cycle parameters for the cleaning machine based on the identified one of the plurality of ware materials.

The system may further include at least one imaging device that captures a pre-wash image of the articles; the storage device further comprising instructions executable by the at least one processor to analyze the pre-wash image to classify the articles as belonging to one of a plurality of article types; and control the one or more parameters for the cleaning process based on the classified one of the plurality of article types and the ware material.

In any of the above examples, the cleaning machine may be an automated dishmachine and the plurality of article types may include a dishware type, a glassware type, a silverware type, a pots/pans type, and a mixed wares type.

The one or more parameters for the cleaning process may include at least one of a wash cycle duration and a rinse cycle duration.

The details of one or more examples are set forth in the accompanying drawings and the description below. Other features will be apparent from the description and drawings, and from the claims.

BRIEF DESCRIPTION OF DRAWINGS

FIG. 8 is a table showing experimental results of ware weight vs. sump temperature drop for multiple dish machine cycles.

DETAILED DESCRIPTION

Figure 1:
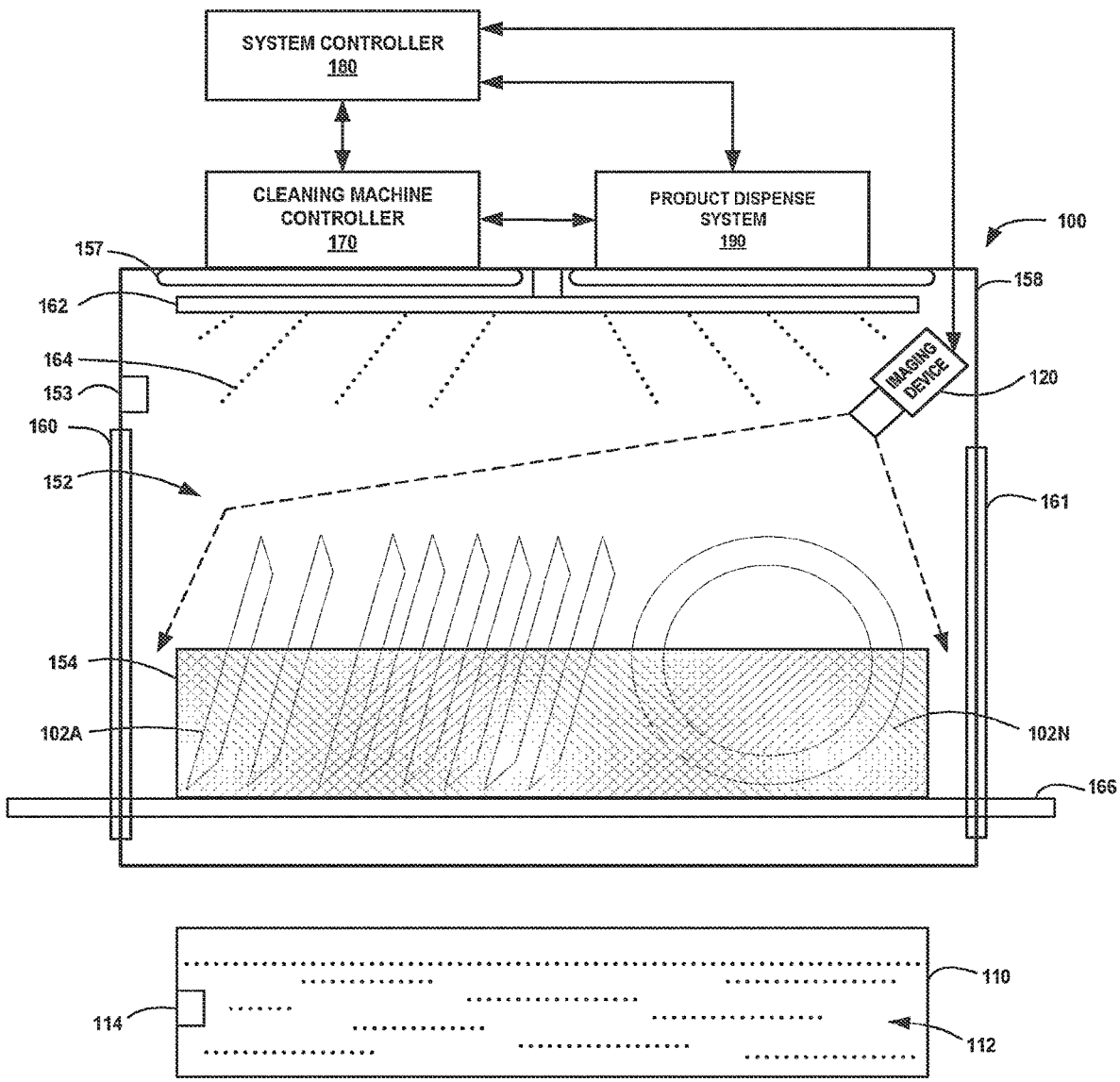
FIG. 1 shows an example automated cleaning machine in which an imaging device captures one or more digital image(s) of wares inside the wash chamber of a cleaning machine in accordance with the present disclosure.

In general, the disclosure is directed to systems and/or methods that analyze one or more images of articles to be cleaned to control a cleaning process of an automated cleaning machine. According to the disclosure, an imaging device compatible with the environment within the wash chamber of an automated cleaning machine captures one or more image(s) of articles to be cleaned. A computing device analyzes the captured image(s) to extract information about the articles. For example, the computing device may analyze the captured image(s) based on a classification model to classify an article type and/or to assign a rack volume corresponding to the articles represented in the captured image. The computing device may also determine a soil level of the articles represented in the captured image(s). The information may be used to control one or more parameters of the cleaning process (e.g., the length of the wash and/or rinse cycle(s), the wash and/or rinse water temperature(s), the detergent concentration, etc.) in order to achieve a satisfactory cleaning and/or sanitizing result for each individual rack. The computing device may also analyze the captured image(s) to extract information about rewash frequency, ware material type, and/or other relevant information regarding the articles to be cleaned.

According to another aspect of the disclosure, machine learning is used to train a computing system to classify articles to be cleaned in one or more training images in an image dataset. A classification model is generated based on the one or more training images in the image data set. The image classification model may be generated by any machine learning algorithm, such a convolutional neural network or other algorithm for building an image classification model. The training images may include one or more images of different article types that may be exposed to a cleaning process in the wash chamber of a cleaning machine. For example, for an automated dish machine, the training images may include one or more images including a dish machine rack loaded with drinking glasses or other glassware; one or more images including a dish machine rack loaded with plates, bowls or other dishware; one or more images including a dish machine rack loaded with eating utensils and other silverware; one or more images including a dish machine rack loaded with pots and pans; and one or more images including a dish machine rack loaded with mixed combinations of article types. For each article type, the training images may further include multiple images including differing numbers of the articles. For example, if the articles are drinking glasses, the training images may include at least one image of a dish machine rack loaded with a maximum number of drinking glasses (i.e., a full rack), and one or more images of a dish machine rack loaded with fewer than the maximum number of drinking glasses (i.e., a less than full rack).

Using the classification model, a computing device analyzes one or more images associated with a cleaning process to classify the articles to be cleaned as to an article type and/or a relative fullness of the rack, or rack volume (i.e., a full rack or something less than a full rack). The system may further correlate the rack volume to an amount of energy needed in heat unit equivalents (HUEs) to achieve adequate sanitization of the wares. In this way, the system may determine whether a cycle has received the correct number of HUEs to achieve adequate sanitization of the wares based the rack volume. The system may further analyze sump temperature information associated with a cleaning process to further control one or more parameters of the cleaning process.

FIG. 1 shows an example automated cleaning machine 100 in which an imaging device 120 captures one or more digital image(s) of wares 102A-102N inside a wash chamber 152 of cleaning machine 100 in accordance with the present disclosure. In this example, cleaning machine 100 is a ware wash or dishmachine for cleaning and/or sanitizing eating and/or food preparation articles 102A-102N. In this example articles 102A-102N are plates. It shall be understood, however, that articles 102A-102N may also include other dishware such as bowls, coffee cups, etc., glassware, silverware, cooking utensils, pots and pans, and any other article type. It shall further be understood that cleaning machine 100 may include any other type of cleaning machine such as clothes or textile washing machines, medical instrument re-processors, automated washer disinfectors, autoclaves, sterilizers, or any other type of cleaning machine, and that the disclosure is not limited with respect to the type of cleaning machine or to the types of articles to be cleaned.

Cleaning machine 100 includes an enclosure 158 defining one or more wash chamber(s) 152 and having one or more door(s) 160, 161 that permit entry and/or exit into wash chamber 152. One or more removable rack(s) 154 are sized to fit inside wash chamber 152. Each rack 154 may be configured to receive articles to be cleaned directly thereon, or they may be configured to receive one or more trays or holders into which articles to be cleaned are held during the cleaning process. The racks 154 may be general or special-purpose racks, and may be configured to hold large and/or small items, food processing/preparation equipment such as pots, pans, cooking utensils, etc., and/or glassware, dishes and other eating utensils, etc. In a hospital or healthcare application, the racks may be configured to hold instrument trays, hardgoods, medical devices, tubing, masks, basins, bowls, bed pans, or other medical items. It shall be understood that the configuration of racks 154, and the description of the items that may be placed on or in racks 154, as shown and described with respect to FIG. 1 and throughout this specification, are for example purposes only, and that the disclosure is not limited in this respect.

A typical cleaning machine such as cleaning machine 100 operates by spraying one or more cleaning solution(s) 164 (a mixture of water and one or more chemical cleaning products) into wash chamber 152 and thus onto the articles to be cleaned. The cleaning solution(s) are pumped to one or more spray arms 162, which spray the cleaning solution(s) 164 into wash chamber 152 at appropriate times. Cleaning machine 100 is provided with a source of fresh water and, depending upon the application, may also include one or more sumps, such as sump 110, to hold used wash and/or rinse solution 112 to be reused in the next cleaning cycle. Cleaning machine 100 may also include or be provided with a chemical product dispenser 190 that automatically dispenses the appropriate chemical product(s) at the appropriate time(s) during the cleaning process, mixes them with the diluent, and distributes the resulting cleaning solution(s) 164 to be dispensed into the wash chamber 152. Depending upon the machine, the articles to be cleaned, the amount of soil on the articles to be cleaned, and other factors, one or more wash cycles may be interspersed with one or more rinse and/or sanitization cycles to form one complete cleaning process of cleaning machine 100.

Automated cleaning machine 100 further includes a controller 170. Controller 170 includes one or more processor(s) that monitor and control various parameters of the cleaning machine 100 such as wash and rinse cycle time(s) and duration(s), cleaning solution concentrations, timing dispensation of one or more chemical products, amounts of chemical products to be dispensed, wash and/or rinse cycle water temperature(s), timing for application of water and chemical products into the wash chamber, etc.

Cleaning machine controller 170 may communicate with a system controller 180 that analyzes images captured by imaging device 120 to dynamically adjust wash and/or rinse cycle times based on the image analysis. System controller 180 communicates the adjusted wash and/or rinse cycle times to cleaning machine controller 170, which then sends the appropriate command signals to the cleaning machine to accomplish the adjusted wash and/or rinse cycle times as determined by system controller 180.

In another example, the functions of system controller 180 may be incorporated into cleaning machine controller 170. In such examples, cleaning machine controller 170 is connected to control imaging device 120 to capture one or more digital image(s) of the rack(s) 154 and/or wares 102A-102N in the wash chamber 152 of the cleaning machine 100. In such examples, cleaning machine controller 170 further analyzes the captured images to identify the type of wares, the amount of wares, and/or the soil level of the wares inside the cleaning machine 100, and dynamically adjusts the wash and/or rinse cycle timing based on the analysis of the captured image(s). It shall be understood, therefore, that one or more functions of the system controller 180, cleaning machine controller 170 and product dispense system 190 may be integrated into a single controller, and that the disclosure is not limited in this respect.

As shown in FIG. 1, one or more articles to be cleaned, such as plates 102A-102N, may be placed on rack 154 and moved into the wash chamber 152 at the start of a cleaning process. Rack 154 may be moved on a conveyor 166 or other supporting structure.

Controller 180 initiates capture of one or more images by imaging device(s) 120 at one or more times during the cleaning process. For example, one or more images of the racks/articles in the wash chamber of the cleaning machine may be captured before the start of the wash cycle, during the wash cycle, between the wash and rinse cycles, during the rinse cycle, and/or after completion of the rinse cycle. That is, one or more images may be captured before the start of the wash cycle, e.g., after the racks/articles have been loaded into the wash chamber but before water/cleaning solution is being pumped into the wash chamber. One or more images may be captured during the wash cycle and/or rinse cycles, e.g., at one or more times when water/cleaning solution is being pumped into the wash chamber. One or more images may also be captured during a dwell time between the wash and rinse cycles when no water/cleaning solution is being pumped into the wash chamber. One or more images may also be captured after completion of the rinse cycle after water/cleaning solution stops being pumped into the wash chamber.

A lighting system 157 that provides suitable lighting inside the wash chamber for purposes of the image capture may also be included. For example, lighting system 157 may include one or more light sources that illuminate the articles to be cleaned with a substantially diffuse, broadband light. The wavelength range of the light emitted by the light sources may include the visible spectrum (i.e., white light) and may also extend into the ultraviolet (UV) and/or infrared (IR) wavelength ranges. In some examples, wavelengths in the UV and/or IR wavelength ranges may be beneficial for detection of certain types of food soil on the articles to be cleaned. The light source(s) may be positioned within the wash chamber so as to reduce (to an extent possible) blocking of the light source by one or more interior components of the cleaning machine and such that the articles/racks are substantially evenly illuminated.

System controller 180 analyzes one or more images associated with the cleaning process to determine the type of articles to be cleaned. System controller 180 may adjust one or more wash parameters of the cleaning process based on the article type being cleaned for each individual rack. The cleaning process parameters may be directed to the type(s) of soils typically encountered when cleaning each article type. For example, pots and pans may be soiled with large amounts of baked or cooked on starch, sugar, protein, and fatty soils. In contrast, drinking glasses or cups are not typically heavily soiled but have hard to remove soils like lipstick, coffee and tea stains. Once system controller 180 analyzes the one or more images associated with a cleaning process to classify an article type, it controls one or more wash parameters of the cleaning process based on the article type to achieve satisfactory cleaning and sanitization result.

Identification of the articles to be cleaned allows dishmachine controller 180 to dynamically adjust the wash and/or rinse cycle times for each individual rack. By performing an image analysis to identify the type of wares in the wash chamber 152 of the cleaning machine 100, the system of the present disclosure can specifically tailor one or more wash parameters based on the type of ware, and the dishmachine can ensure that adequate cleaning and sanitization results are achieved for each individual cleaning process of the cleaning machine 100.

In use, the relative amount or number of articles to be cleaned will generally vary between cleaning processes. For example, some cleaning processes will be run with full racks, and other cleaning processes will be run with partially filled racks ranging anywhere from nearly empty to nearly full. The relative amount of articles per rack may be defined for purposes of the present disclosure as the rack volume. Using the techniques of the present disclosure, the present system may determine the rack volume for each individual cleaning process based on analysis of the one or more captured image(s) associated with the cleaning process. In accordance with the present disclosure, it has been determined that the rack volume influences the amount of heat energy needed to achieve adequate sanitization of the wares. In some examples, the system and methods of the present disclosure may dynamically adjust the wash and/or rinse cycle times based on the rack volume to ensure that the articles to be cleaned are exposed to at least a heat energy threshold value during the cleaning process to achieve adequate sanitization of the articles to be cleaned based on the rack volume.

In some examples, the cleaning machine 100 may include one or more sensors that provide additional information about the parameters of the cleaning process. For example, cleaning machine 100 may include one or more temperature sensor(s) 153 that measure a temperature inside of the wash chamber 152. In the example of FIG. 1, temperature sensor 153 is positioned on a sidewall inside the wash chamber 152 of cleaning machine 100. The cleaning machine 100 may further include a sump temperature sensor 114 that measures a temperature of solution 112 in sump 110. For example, the sump water temperature may be measured at the start of a cleaning process, and at the end of the same cleaning process to determine a difference in the sump water temperature that occurred during the cleaning process. As another example, the sump water temperature may be measured or sampled continuously throughout the cleaning process. The continuous sump water temperature data may be analyzed to identify a rate of change of the sump water temperature (e.g., the slope or the derivative of the temperature vs. time curve at any given point) at the beginning of a cleaning process or at any other point in time during the cleaning process. The system may analyze the difference in the sump water temperature from one point in time to another point in time, and/or the rate of change in sump water temperature at any given point(s) in time, either alone or in conjunction with other data pertaining to the cleaning cycle, to determine and/or adjust the cleaning cycle parameters sufficient to adequately clean and/or sanitize the wares exposed to the associated cleaning process of cleaning machine 100.

Once the cleaning process is complete, imaging device 120 may capture one or more additional images of wares 102A-102N. The post-wash image capture may occur either inside the wash chamber, as mentioned above, or outside of the wash chamber. The system controller 170 analyzes the post-wash image(s) to determine a post-cycle soil level of the wares 102A-102N. The post-cycle soil level of the wares is compared to a "clean" threshold to determine whether adequate soil removal occurred during the cleaning process. The "clean" threshold may be dependent upon the type of ware, the type of soil, the type of information contained in the image data, the type of image analysis performed by the system, and other factors. If the post-cycle soil level of the wares does not satisfy the "clean" threshold", the controller 170 may determine an extended wash cycle time necessary to adequately clean the soil remaining on the articles. An extended wash/rinse cycle for the determined extended was cycle time may then be executed in order to achieve adequately cleaning of the remaining soil.

The controller 170 may also analyze the rack volume and the accumulated heat energy for the cycle and compare to a sanitization threshold to determine whether the accumulated heat energy was sufficient to achieve adequate sanitization of the wares. If the accumulated heat energy does not satisfy the sanitization threshold, controller 170 may determine an extended rinse cycle time necessary to achieve a heat energy level that satisfies the sanitization threshold. An extended rinse cycle for the determined extended rinse cycle time may then be executed in order to achieve adequate sanitization of the wares.

In this way, the techniques of the present disclosure dynamically control one or more parameters of a cleaning process based on analysis of images associated with the cleaning process so as to ensure that the articles are adequately cleaned and sanitized. The system may thus finely tune the wash and/or rinse cycle parameters for each individual cleaning process based on analysis of the one or more captured images associated with the cleaning process to ensure adequate cleaning and sanitization of the articles. This may result in a reduction of wash, rinse, and/or total cycle times for individual cleaning cycles and a reduction in the average wash, rinse, and/or total cycle times required for multiple cleaning cycles. The techniques of the present disclosure may thus result in a reduction in a total amount of water and/or energy required for each cleaning process and the average amount of water and/or energy required for multiple cleaning cycles (due, for example, to shorter cycle times and less energy required to heat the water), all while ensuring that the articles exposed to a cleaning process inside a cleaning machine are adequately cleaned and sanitized. This may further result in reduced water, energy, and/or labor costs and increased efficiency in terms of cost and/or time required to complete each individual cleaning process.

In some examples, the system may generate one or more reports or notifications regarding the cleaning process. For example, a computing device may generate, based on the cleaning machine cycle data generated during the cleaning process, a notification for display, such as display on a user computing device, that includes cleaning cycle parameters associated with the cleaning process, one or more images of the wares captured by imaging device 120 before, during, and/or after completion of the cleaning process, data monitored during the cleaning process or data generated based on analysis of the data monitored or images obtained before, during, or after the cleaning process, and/or any information associated with the cleaning process or cleaning process(es) run by one or more cleaning machines. The displayed data may further include one or more graphs or charts of the data monitored or generated with respect to cleaning process and/or one or more targets for the cleaning process.

Identification of the types of wares associated with each cleaning process, and the cleaning process data associated with each cleaning process, may further be analyzed to identify the number and type of cleaning processes over specified time periods, view historical data on problems encountered during one or more cleaning processes, view data regarding the general operation of one or more cleaning machines (e.g., how many cycles per day/week/month, how often it is drained, cycle times, temperatures, dispensed chemical amounts, etc.), the types of wares washed during particular times and days of the week, whether racks are being run full or underfilled, etc., and this information may be used to create reports to improve management of a ware washing or other article cleaning facility.

Figure 2:
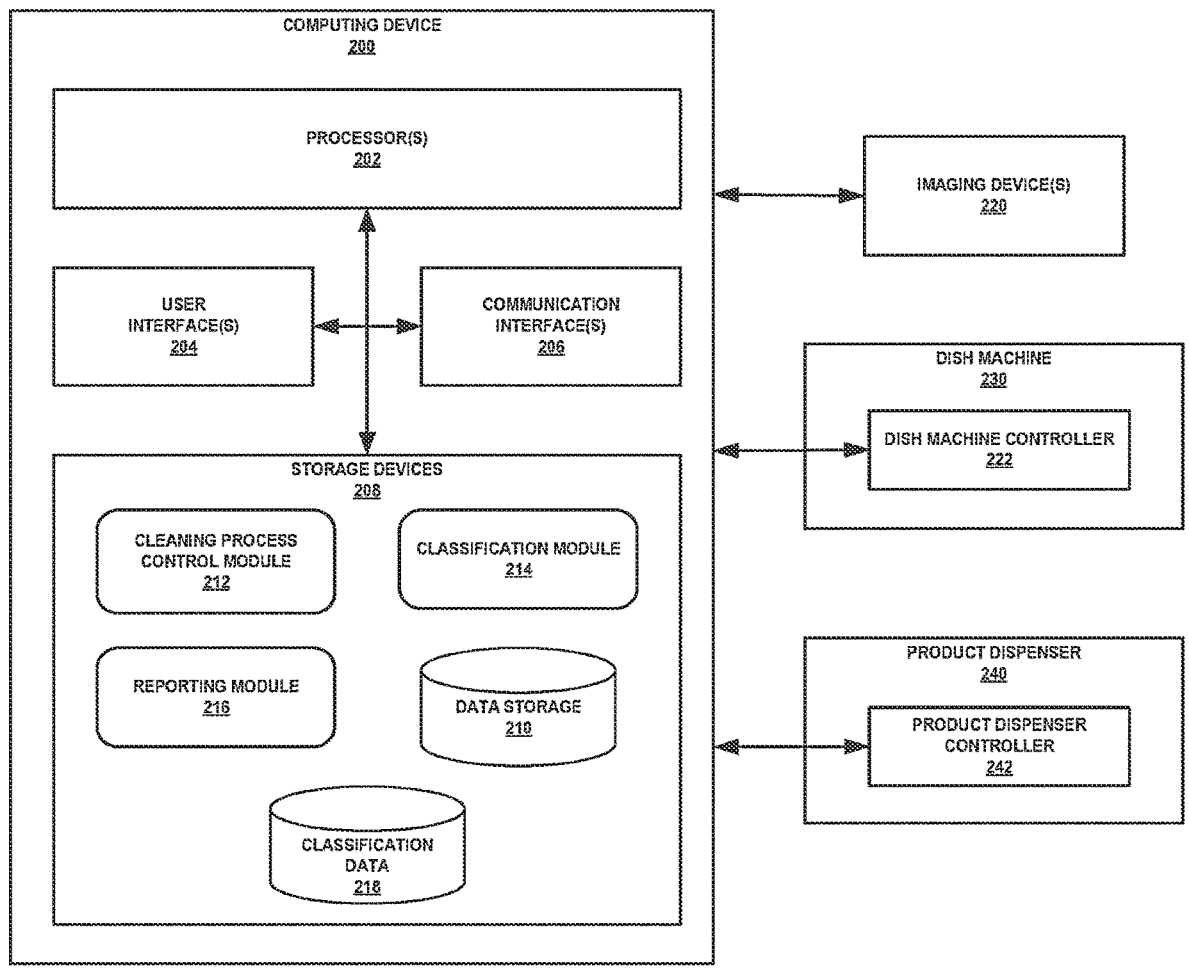
FIG. 2 is a block diagram of an example computing system that dynamically controls cycles of a cleaning machine using machine vision in accordance with the present disclosure.

FIG. 2 is a block diagram showing an example computing device 200 that controls one or more cycles of a cleaning process based on analysis of one or more captured image(s) of articles to be cleaned in accordance with the present disclosure. Computing device 200 may include, for example, a mobile computing device, a smart phone, a tablet computer, a laptop computer, a desktop computer, a server computer, a personal digital assistant (PDA), a portable gaming device, a portable media player, an e-book reader, a wearable computing device, a smartwatch, a television platform, or another type of computing device. In some examples, the functions of computing device may be integrated into the dish machine controller 232 (or other associated cleaning machine controller), and it shall be understood that the disclosure is not limited in this respect.

Computing device 200 includes one or more processors 202, one or more user interface components 204, one or more communication components 206, and one or more data storage components 208. User interface components may include one or more of audio interface(s), visual interface(s), and touch-based interface components, including a touch-sensitive screen, display, speakers, buttons, keypad, stylus, mouse, or other mechanism that allows a person to interact with a computing device. Communication components 206 allow computing device 200 to communicate with other electronic devices, such as imaging device 220, a dish machine controller 222, a product dispenser controller 242 and/or other remote or local computing devices. The communication may be accomplished through wired and/or wireless connections.

Imaging device(s) 220 may include one or more a digital camera, a scanner, a webcam, or any other type of imaging device. Imaging device(s) 220 is compatible with the environment in the wash chamber of a cleaning machine, and in some examples is able to withstand exposure to the conditions in the wash chamber of a commercial cleaning machine for a minimum amount of time, such as five years. For example, imaging device(s) 220 should be sufficiently waterproof to withstand exposure to the environment within a commercial dish machine for a reasonable amount of time, such as five years. In another example, imaging device(s) 220 may include or be mounted within a waterproof enclosure including a window through which the images are captured. The enclosure/window may be incorporated into an interior sidewall of a dish machine or may be adhered to an interior sidewall of a dish machine.

Imaging device(s) 220 may be positioned in the wash chamber 152 of the cleaning machine 100 such that the field of view of each captured image includes the area within the wash chamber 152 within which a rack may be positioned. In other words, the area of inspection captured by the imaging device 220 includes the entire outer perimeter of any rack that may be loaded into the dishmachine, such that all of the wares loaded into each rack and present within the wash chamber 152 are captured in an image. In some examples, computing device 200 may, during analysis of the one or more captured images, detect that some of the wares in the rack are blocked (either by some interior component of the dishmachine or by other wares loaded onto a rack), and computing device 200 may, in those instances, be further configured to extrapolate information concerning the blocked wares in the image based on information (such as ware type, soil level, etc.) extracted from the remainder of the image.

Computing device 200 includes one or more storage device(s) 208 that include a classification module 214, a cleaning process control module 212, and a verification module 216. Modules 212, 214, and 216 may perform operations described using software, hardware, firmware, or a mixture of hardware, software, and firmware residing in and/or executing at computing device 200. Computing device 200 may execute modules 212, 214, and 216 with one or more processors 202. Computing device 200 may execute modules 212, 214, and 216 as a virtual machine executing on underlying hardware. Modules 212, 214, and 216 may execute as a service or component of an operating system or computing platform. Modules 212, 214, and 216 may execute as one or more executable programs at an application layer of a computing platform. User interface 204 and modules 212, 214, and 216 may be otherwise arranged remotely to and remotely accessible to computing device 200, for instance, as one or more network services operating at a network in a network cloud.

In accordance with the present disclosure, classification data 218 includes article type and rack volume information generated by a machine learning analysis of one or more training image(s) in an image dataset. The training image(s) may include one or more images of articles of different article types. Each article type corresponds to a different type of article that may be exposed to a cleaning process in the wash chamber of cleaning machine 230. For example, for an automated dish machine, the plurality of article types may include a glassware type, a dishware type, a silverware type, and a pots/pans type, a mixed wares type (some combination of glassware, dishware, silverware, and/or pots and pans). The training images may therefore include one or more images including a dish machine rack loaded with drinking glasses ("glassware" type), one or more images including a dish machine rack loaded with plates, bowls or coffee cups ("dishware" type), one or more images including a dish machine rack loaded with eating utensils ("silverware" type), one or more images including a dish machine rack loaded with pots and pans ("pots/pans" type), and one or more images including a dish machine rack loaded with some combination of article types ("mixed wares" type). In this way, each training image is classified as to the type of ware represented in the training image, and this information (stored in classification data 218, for example) may be subsequently applied to classify one or more image(s) associated with a wash process in order to determine the type of ware to be cleaned, and to control one or more parameters of the wash process based on the article type.

For each article type, the associated training image data set may include multiple images each including a different number of the articles. These training images may be used to assign a rack volume to an image. For example, when the articles are drinking glasses, the training images may include at least one image of a dish machine rack loaded with a maximum number of drinking glasses (i.e., a full rack), and one or more images of a dish machine rack loaded with fewer than the maximum number of drinking glasses (i.e., less than full rack (s)). In this way, learning module 210 may classify training images both as to the type of article type and the rack volume.

The training images and their corresponding classifications are stored in data storage 218 for use by classification module 214 when analyzing captured images to control a cleaning process to achieve adequate cleaning and sanitization results.

Classification module 214 includes instructions that are executable by processor(s) 202 to perform various tasks. For example, classification module 214 includes instructions that are executable by processor(s) 202 to initiate capture of one or more digital image(s) of a rack of unknown articles to be cleaned, analyze the one or more digital images based on stored classification data from a training dataset, and classify the images according to the types of articles recognized based on analysis of the one or more captured images. Classification module 214 may classify each of the captured images into one of a plurality of types, each type corresponding to a different type of article that may be exposed to a cleaning process in the wash chamber of cleaning machine 230. For example, for an automated dish machine, the types may include one or more of a glassware type, a dishware type, a silverware type, a pots/pans type, and a mixed wares type. The unknown articles in the captured images may therefore include one or more images including a dish machine rack loaded with glassware, dishware, silverware, pots and pans, or a mixed rack including more than one ware type. Classification module 214 includes instructions that when executed cause processor(s) to classify the one or more captured images as to the type of ware present in the image(s), and thus the type of ware present in the wash chamber of the cleaning machine.

Classification module 214 may further include instructions that are executable by the processor(s) to classify the one or more captured images according to a rack volume. For example, if the articles are drinking glasses, the captured image(s) may be classified as ware type "glassware" and also be assigned a rack volume indicative of the relative fullness of the rack. In some examples, the rack volume may be measured in terms of one or more fullness categories (e.g., "full", "medium-full", or "minimally-full"), as an absolute number of articles in a rack, or as a scalar value between a minimum and a maximum value (for example, a scalar value between 0 and 100, where 0 represents an empty rack and 100 represents a full rack, or any other range of normalized scalar values). It shall be understood that the system may utilize any relevant measure to quantify or characterize the amount, number or volume of articles in a rack, and it shall be understood that the disclosure is not limited in this respect.

In this way, the classification module 214 may classify captured images both as to the article type and the rack volume.

Cleaning process control module 212 includes instructions that are executable by processors 202 to perform various tasks. For example, cleaning process control module 212 includes instructions that are executable by processor(s) 202 to control one or more cycles of a cleaning process based on analysis of one or more captured image(s) in accordance with the present disclosure.

Cycle data corresponding to one or more article type classifications and/or one or more rack volume classifications may be stored in data storage 210. This information may be empirically determined based on experimental results of cleaning processes run with varying article types, soil types, and rack volumes, along with cleaning machine parameters such as wash and rinse water temperatures, wash and rinse cycle time(s) and duration(s), water hardness, pH, turbidity, cleaning solution concentrations, timing for dispensation of one or more chemical products, amounts of chemical products dispensed, etc.

An example table showing cycle data corresponding to one or more article type classifications and/or one or more rack volume classifications is shown in Table 1.

TABLE 1

| Ware Type Classification | Rack Volume | Sump Starting Temp (° F.) | Wash Cycle Time | Rinse Cycle Time |
|---|---|---|---|---|
| Glasses | Full | 155 | 25 | 12 |
| Glasses | Medium | 155 | 25 | 9 |
| Glasses | Minimal | 155 | 25 | 7 |
| Dishes | Full | 155 | 50 | 7 |
| Dishes | Medium | 155 | 45 | 7 |
| Dishes | Minimal | 155 | 40 | 7 |
| Silverware | Full | 155 | 45 | 9 |
| Silverware | Medium | 155 | 40 | 7 |
| Silverware | Minimal | 155 | 40 | 7 |
| Pots and Pans | Full | 155 | 60 | 10 |
| Pots and Pans | Medium | 155 | 55 | 9 |
| Pots and Pans | Minimal | 155 | 50 | 8 |
| Mixed | Full | 155 | 50 | 7 |
| Mixed | Medium | 155 | 45 | 7 |
| Mixed | Minimal | 155 | 40 | 7 |

The rack volume may be correlated to the amount of energy needed in heat unit equivalents (HUEs) to achieve sanitization of the articles inside the cleaning machine. In general, according to the FDA Food Code guidelines, "sanitization" means the application of cumulative heat or chemicals on cleaned food contact surfaces that is sufficient to yield a 5-log reduction of representative disease microorganisms of public health importance. The FDA Food Code and NSF International Standard have established a value of 3600 HUEs as the requirement for achieving adequate sanitization.

For a given wash water temperature, the relative number of articles loaded onto a rack impacts the duration of the wash cycle needed to accumulate the required amount of energy to achieve adequate cleaning and/or sanitization of the articles in the wash chamber of the cleaning machine. For example, in a fully loaded rack, crowding, overlapping or close spacing of articles in the rack make it more difficult for cleaning solution to reach certain areas of the wares in the rack. This may translate to longer wash and/or rinse cycle durations in order to ensure that all surfaces of the wares are adequately cleaned and/or sanitized. In accordance with the techniques of the present disclosure, one or more image(s) of articles to be cleaned may be analyzed to classify the articles as to an article type and to determine a rack volume, such that one or more parameters of the wash and/or rinse cycles of a cleaning process may be controlled to ensure that the articles are adequately cleaned and sanitized as a result of the cleaning process, regardless of the article type or the volume of articles loaded onto a rack.

In addition, the ware material itself may affect the wash parameters needed to reach the minimum amount of heat energy in order to achieve adequate sanitization. This may be based at least in part on the heat capacity of the ware material. For example, the cleaning process parameters necessary to achieve adequate sanitization of plastic dishware may be different than the cleaning process parameters necessary to achieve adequate sanitization of ceramic dishware. As another example, the cleaning process parameters necessary to achieve adequate sanitization of plastic eating utensils may be different than the cleaning process parameters necessary to achieve adequate sanitization of metal eating utensils. In accordance with the present disclosure, the heat capacity of the ware material in the cleaning machine may result in a characteristic variation in sump water temperature over the course of a cleaning process. In some examples, sump water temperatures measured at one or more times during the cleaning process may be used to identify a ware type material, and one or more cleaning process parameters may be dynamically adjusted based on the ware type material to ensure an adequate cleaning and sanitizing result in achieved.

In accordance with the present disclosure, cleaning process control module 212 may further include instructions executable by the processor(s) 202 to analyze one or more post-wash image(s) to verify adequate soil removal on articles subjected to a cleaning process, and to further control one or more cycles of a cleaning process based on the analysis of one or more post-wash image(s). For example, if analysis of one or more post-wash image(s) determines that the soil on article(s) have not been adequately removed, cleaning process control module 212 may determine an extended wash cycle duration and an extended rinse cycle duration needed in order to adequately clean the soil remaining on the article(s) in the cleaning machine. Based on the analysis of the post-wash image(s), computing device 200 controls the cleaning machine to automatically execute the extended wash and rinse cycles of the determined duration. In this example, the wash cycle duration is extended because of the determination that the soil was not adequately removed, and that thus the articles in the wash chamber required further cleaning in order to completely remove the soil remaining on the articles. The rinse cycle is also extended in this example in order to rinse the cleaning solution applied during the extended wash cycle.

In this way, cleaning process control module 212 may dynamically control the total duration of the wash cycle(s) (the initial wash cycle(s) duration and the extended wash cycle duration) and the total duration of the rinse cycle(s) (the initial rinse cycle(s) duration and the extended rinse cycle duration) based on analysis of one or more image(s) of articles in the wash chamber of a cleaning machine to ensure that an adequate cleaning result (i.e., adequate soil removal) is achieved.

In accordance with the present disclosure, cleaning process control module 212 may further include instructions executable by the processor(s) 202 to determine the heat energy accumulated over the course of a cleaning process to determine whether adequate sanitization of articles subjected to the cleaning process has been achieved, and to further control one or more cycles of the cleaning process based on the result. For example, if the heat energy accumulated during the course of the cleaning process is insufficient to achieve adequate sanitization of the articles, cleaning process control module 212 may determine an extended rinse cycle duration needed in order to adequately sanitize the article(s) in the cleaning machine. Computing device 200 may then control the cleaning machine to automatically execute the extended rinse cycle of the determined duration. In this example, assuming computing device 200 has previously determined based on analysis of the one or more images that the soil was adequately removed from the articles, the rinse cycle duration is extended because application of additional hot rinse water during an extended rinse cycle may accomplish the additional heat transfer necessary to satisfy the sanitization threshold. In this way, cleaning process control module 212 may dynamically control the duration of the rinse cycle based on a calculated amount of heat energy accumulated over the duration of a cleaning process to ensure that an adequate sanitization result is achieved.

In accordance with the present disclosure, cleaning process control module 212 may further include instructions executable by the processor(s) 202 to analyze sump water temperatures measured at one or more times during the cleaning process to identify a ware material, and to control one or more cleaning process parameters based on the ware material to ensure an adequate cleaning and sanitization result. For example, cleaning process control module 212 may analyze sump water temperatures measured at one or more times during the cleaning process to identify a characteristic variation in sump water temperature corresponding to a particular ware material. In some examples, cleaning process control module 212 analyzes one or more sump water temperatures measured near the beginning of the cleaning process to identify a ware material of the articles present in the wash chamber, and may automatically adjust one or more cleaning process parameters based on the ware material to ensure an adequate cleaning and sanitizing result in achieved. In other examples, cleaning process control module 212 analyzes one or more sump water temperatures measured over the course of the cleaning process to identify a ware material of the articles present in the wash chamber, and may automatically determine extended wash and/or rinse cycle durations based on the ware material to ensure an adequate cleaning and sanitizing result in achieved.

Reporting module 216 (or any of cleaning process control module 212, classification module 214, or other software or module stored in storage devices 208) may generate one or more notifications or reports for storage or for display on user interface 204 of computing device 200, or on any other local or remote computing device, regarding the results of one or more cleaning processes. For example, the following are example reports concerning a cleaning process carried out on Aug. 7, 2019, including the ware type classification (glasses) and the rack volume (medium) extracted from analysis of one or more image(s) captured during the cleaning process.

Cleaning Cycle Overview

| | |
|---|---|
| Date/Time | Jun. 7, 2019 02:35:14 |
| Location | Store #302, St. Paul, MN |
| Machine ID | B-12345 |
| Soil Removal Score | Pass |
| Sanitization Score | Pass |
| Ware Type | Glassware |
| Rack Volume | Medium (Scalar Value 45) |
| Sump Starting Temp (° F.) | 155 |
| Sump End Temp (° F.) | 153 |
| Total Cycle Time | 47 |
| HUEs Accumulated | 4852 |
| Employee ID | 9876554 |

Cleaning Cycle Details

| Parameter | Cycle Data | Specification/Target |
|---|---|---|
| Wash Cycle Time | 25 | 25 |
| Dwell Time | 8 | 8 |
| Rinse Time | 9 | 9 |
| Load Time | 5 | 5 |
| Total Cycle Time | 47 | 47 |
| Wash Water Temp. | 155° F. | 155° F. (minimum) |

-continued

| Parameter | Cycle Data | Specification/Target |
|---|---|---|
| Water Consumption | 0.47 gal/rack | 0.47 gal/rack |
| Rinse Water Temp | 180° F. | 180° F. (minimum) |
| Wash Product | Dishmachine Detergent-All Purpose | Dishmachine Detergent-All Purpose |
| Wash Product Dilution | 0.1% | 0.1% |
| Rinse Product | Rinse Additive-All Purpose | Rinse Additive-All Purpose |
| Rinse Product Dilution | 0.0020% | 0.0020% |
| Sanitizer Product | Solid Sanitizer | Solid Sanitizer |
| Sanitizer Product Dilution | 0.018% | 0.018% |

In this example, the ware type was classified as "glassware" and the rack volume was classified as "medium" or a scalar value of 45 (on a scale of 0-100, for example). As another example, the reports may include data corresponding to one or more specific cleaning processes, or data concerning cleaning processes specific to one or more of a location(s), a cleaning machine(s), a date(s)/time(s), an employee, etc. The data may be used to identify trends, areas for improvement, or otherwise assist the organizational person(s) responsible for ensuring the efficacy of cleaning processes to identify and address problems in the cleaning processes.

The report(s) may further include information for one or more cleaning processes/cycles, and the data for each cleaning process may include information such as the date and time of the cleaning process, a unique identification of the cleaning machine, a unique identification of the person running the cleaning process and/or the cleaning verification procedure, the classified article type cleaned during the cleaning process, the rack volume types of racks or trays used during the cleaning process, the types and amounts of chemical product dispensed during each cycle of the cleaning process, the volume of water dispensed during each cycle of the cleaning process, a "pass" or "fail" indication for the cleaning process, or other information relevant to the cleaning process or the cleaning process verification procedure. The report(s) may also include information concerning the location; the business entity/enterprise; corporate clean verification targets and tolerances; cleaning scores by location, region, machine type, date/time, employee, and/or cleaning chemical types; energy costs; chemical product costs; and/or any other cleaning process data collected or generated by the system or requested by a user.

Figure 3:
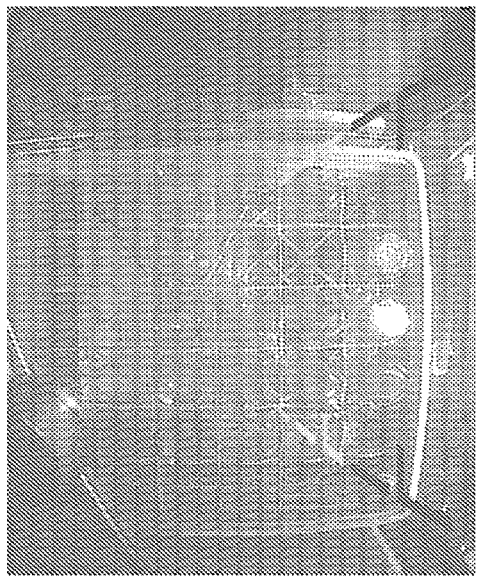
FIG. 3 is an example image of a dishmachine rack with 36 glasses having an article type "glassware" and a rack volume of "full" in accordance with the present disclosure.
Figure 4:
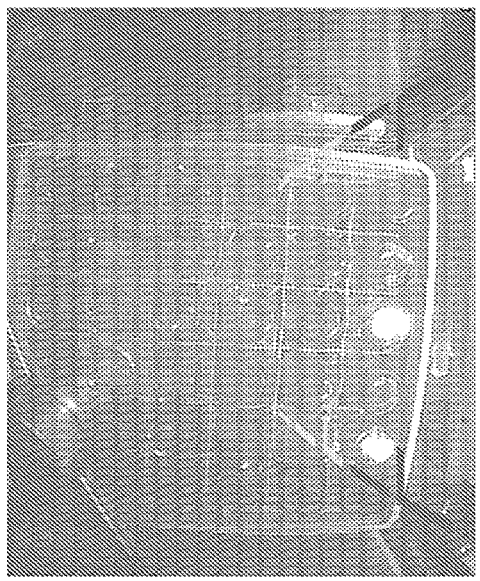
FIG. 4 is an example image of a dishmachine rack with 15 glasses having an article type "glassware" and a rack volume of "medium full" in accordance with the present disclosure.
Figure 5:
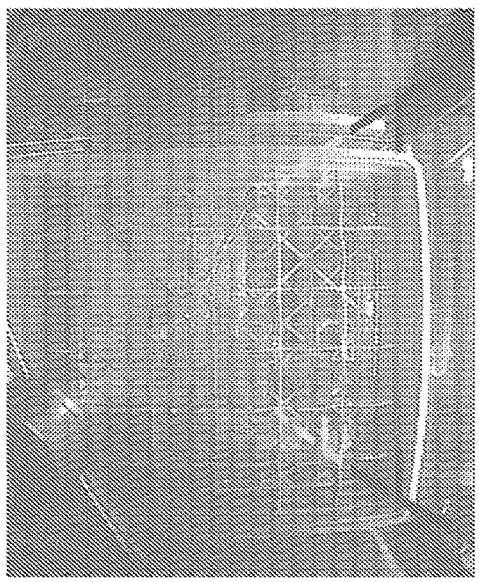
FIG. 5 is an example image of a dishmachine rack with 5 glasses having an article type "glassware" and a rack volume of "minimally full" in accordance with the present disclosure.

FIGS. 3-5 are example images of a dishmachine rack loaded with differing numbers of glasses that may be analyzed by a computing device to classify a ware type (glassware) and to determine a rack volume for wares in the wash chamber of a dishmachine in accordance with the present disclosure. More specifically, FIG. 3 shows an example image of a dishmachine rack loaded with 36 glasses. The rack volume determined based on analysis of the image of FIG. 3 may be classified as a "full" rack; or, if a scalar value from 0-100 is used, assigned a scalar value of "100." FIG. 4 shows an example image of a dishmachine rack loaded with 15 wares of the type "glassware" positioned somewhat randomly throughout a rack, which may be classified as "medium-full" or assigned a scalar value of "45." FIG. 5 shows an example image of a dishmachine rack loaded with 5 glasses, which may be classified as "minimally-full" rack or assigned a scalar value of "12" for example.

In some examples, classification module 210 includes instructions executable by the processor(s) to perform one or more image pre-processing techniques on the original images before they are analyzed for classification purposes. For example, the processor(s) may convert the original image(s) to grayscale; apply one or more smoothing or denoising filters to the image(s); crop, resize, or compress the image(s); reduce the file size of the image(s); and/or perform any other appropriate image processing techniques on the image(s) to prepare the image(s) for classification phase of the process. In some examples, these image pre-processing techniques may reduce the amount of data in each of the analyzed images so as to improve speed and efficiency of the image classification analysis while still ensuring accurate classification results.

Figure 6:
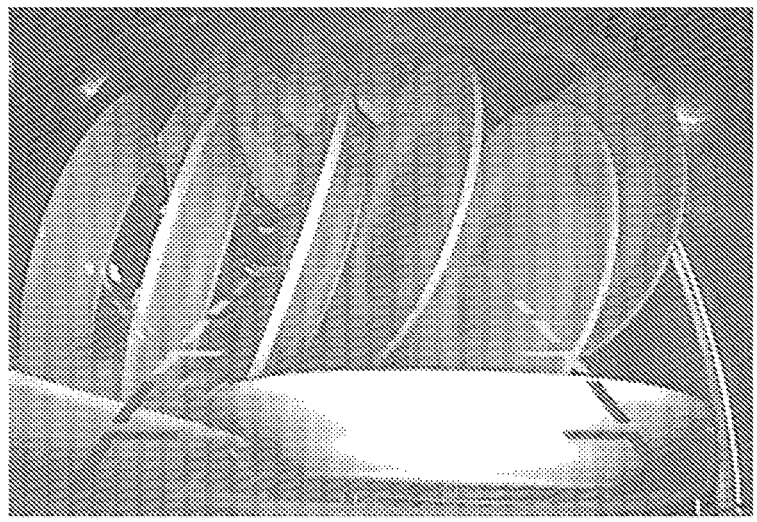
FIG. 6 is an example image of a dishmachine rack with plates having an article type "dishware" in accordance with the present disclosure.
Figure 7:
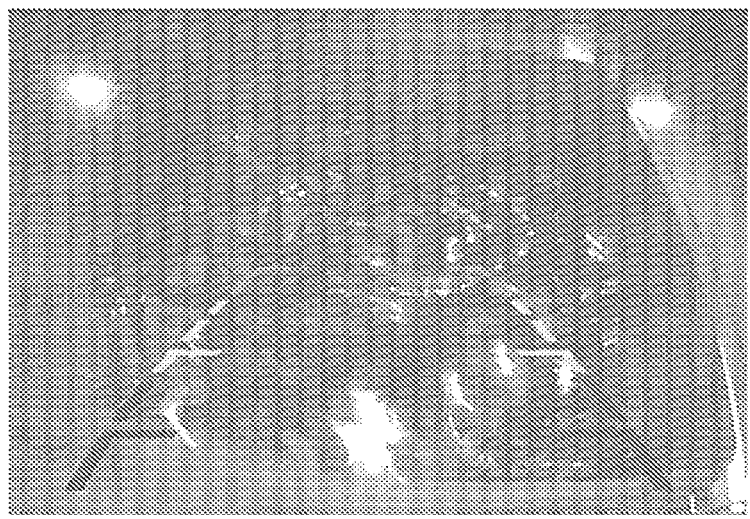
FIG. 7 is an example image of a dishmachine rack with eating utensils having an article type "silverware" in accordance with the present disclosure.

FIGS. 6-7 are additional example (original or un-preprocessed) images of dishmachine racks that may be analyzed by a computing device to classify each image as to a ware type and to determine a rack volume in accordance with the present disclosure. In the example of a dish machine, the article types may include, in addition to a glassware type as shown in the example images of FIGS. 3-5, one or more of a dishware type, a silverware type, a pots/pans type, and a mixed wares type (some combination of glassware, dishware, silverware, and/or pots and pans). FIG. 6 is an example image of a dishmachine rack loaded with plates that may be analyzed by a computing device to classify a ware type (dishware) for wares in the wash chamber of a dishmachine in accordance with the present disclosure. FIG. 7 is an example image of a dishmachine rack loaded with silverware that may be analyzed by a computing device to classify a ware type (silverware) in accordance with the present disclosure. Rack volumes for each of the example images of FIGS. 6 and 7 may also be determined, and the cleaning processes associated with each of the example images may be controlled as described herein based on the article type and the rack volume to achieve an adequate cleaning and sanitization result.

Figure 9:
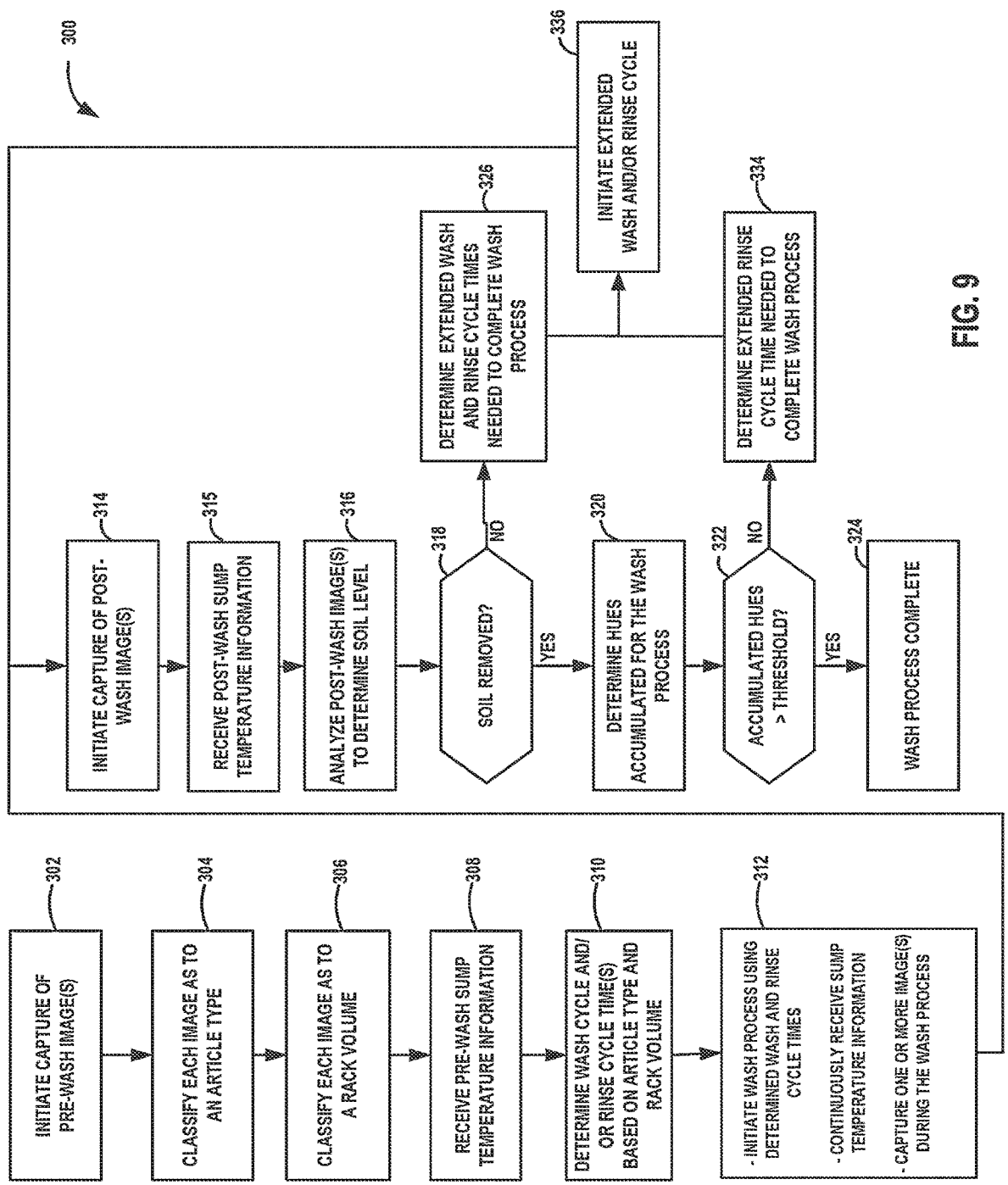
FIG. 9 is a flowchart illustrating an example process by which a computing device controls one or more wash and/or rinse cycles in a cleaning machine based on analysis of one or more captured image(s) in accordance with the present disclosure.

FIG. 9 is a table showing experimental results of ware weight vs. sump temperature drop for multiple dish machine cycles. The wash and rinse cycle times were kept consistent across each cycle. Column 2 shows the rack volume (shown as "Ware Amount" in the header of column 2) for several cycles of a dish machine. The first six cycles had a rack volume of 3 plates, and the next six cycles had a rack volume of "Full." The ware weight, starting sump temperature, minimum sump temperature, and sump temperature drop are shown in columns 3-6, respectively.

FIG. 9 indicates that the sump temperature drop (max-min) for cycles having full racks was generally greater than the sump temperature drop for the cycles having 3 plates per rack. This means that the amount of heat energy accumulated over the course of the cycle (each of the cycles in FIG. 9 having the same wash cycle times, rinse cycle times, and total cycle times) is less for cycles having full racks as compared to cycles having less than full racks.

To compensate for this, the techniques of the present disclosure control the wash and/or rinse cycle times based on the rack volume as determined by the classification module 214. For example, when the processor(s) executing the classification module 214 classify, based on analysis of a captured image of wares inside the wash chamber of a dish machine, a rack volume as "full" (or other rack volume characterization) the cleaning process control module 212 may adjust the length of the wash and/or rinse cycles of a cleaning process to ensure that a sufficient amount of energy (as measured in HUEs, for example) is transferred to the wares during the dish machine cycle. More specifically, the cleaning process control module 212 may set a longer duration for the wash cycle and/or rinse cycle corresponding to rack classified as "full" as compared to the duration of the wash cycle and/or rinse cycle corresponding to a rack classified as "medium-full" or classified as "minimally full."

FIG. 9 is a flowchart illustrating an example process (300) by which a computing device controls one or more wash parameters of a cleaning process in a cleaning machine based on analysis of one or more captured image(s) in accordance with the present disclosure.

At a time near the start of a cleaning process, the computing device (such as computer device 180 as shown in FIG. 1 or computing device 200 as shown in FIG. 2) initiates capture of one or more pre-wash image(s) of the articles to be cleaned by a cleaning process (302). For example, at an appropriate time at or near the start of a cleaning process, a computing device may send a command signal to an imaging device, (or to multiple imaging devices if the implementation includes more than one imaging device), such as imaging device 120 as shown in FIG. 1 (302), instructing the imaging device to capture an image. In some examples, such as the example of FIG. 1, the imaging device is located inside the wash chamber of the cleaning machine so as to capture images of the wares/rack inside the wash chamber. In this way, the imaging device may capture one or more image(s) of the wares/rack inside the wash chamber of the cleaning machine at any point before the start of the wash process, during the wash process, and after completion of the wash process. In other examples, additional imaging device(s) may be positioned near an exterior of the wash chamber, such as on or near the exterior side of the entry door, so as to capture images of the wares/rack shortly before entry into the wash chamber. In other examples, additional imaging device(s) may be positioned on or near the exterior side of the exit door, so as to capture images of the wares/rack after they exit the wash chamber.

The images captured before the start of the wash process, either by an imaging device inside the wash chamber or by an imaging device on or near the exterior side of the entry door, may be analyzed to extract article type information and rack volume information about the articles to be cleaned during a wash process. This information may then be used to control one or more parameters of the cleaning process to help ensure that adequate cleaning and/or sanitization results are achieved. Images captured after completion of the wash process, either by an imaging device inside the wash chamber or by an imaging device on or near the exterior side of the exit door, may be analyzed to extract soil removal information about the articles that were cleaned during the cleaning process, and the soil removal information may be used to verify whether the articles were satisfactorily cleaned.

In one example, the timing for initiation of the pre-wash image capture may be based on sensing of opening and/or closure of a wash chamber entry door (such as entry door 160 of FIG. 1). In another example, manual activation of the wash chamber, such as by actuation of a "start" button or switch by a user, may be used to initiate capture of the one or more image(s). In some examples, pre-wash images of articles/racks inside the wash chamber of a cleaning machine may be captured at a time (or times) before cleaning solution is sprayed into the wash chamber of the cleaning machine. In other examples, pre-wash image(s) may be captured at a time (or times) when cleaning solution is being pumped into the wash chamber of the cleaning machine. In any event, the pre-wash images are captured near the beginning of the wash process, such that the extracted article type and/or rack volume information may be used to control one or more parameters of the wash process.

Referring again to FIG. 9, a computing device analyzes each pre-wash image to classify each image as to an article type (304). In a dish machine, for example, the article types may include a dishware type, a glassware type, a silverware type, a pots/pans type, a mixed wares type (some combination of glassware, dishware, silverware, and/or pots and pans) and/or any other type of articles that may be cleaned by an automated dish machine. The computing device further analyzes each pre-wash image to classify each image as to a rack volume (306). In a dish machine, for example, the rack volumes may include full, medium-full, and minimally full. In another example, the rack volumes may be assigned a scalar value indicative of the relative fullness of the rack. For example, the rack volumes may be assigned a scalar value from 0-100, where 0 represents and empty rack and 100 represents a full rack. Alternatively, scalar values having different normalized ranges may be used, such as a range of 0-1 where 0 represents an empty rack and 1 represents a full rack. It shall be understood, therefore, that rack volume may be represented in many different ways, and that the disclosure is not limited in this respect.

In addition, at an appropriate time at or near the beginning of the cleaning process, the computing device receives a starting sump temperature information (308). For example, the sump temperature may be sensed by a temperature sensor which determines the temperature of the cleaning solution in the sump, such as sensor 114 and sump 110 and cleaning solution 112 as shown in FIG. 1. The sump temperature information may be used to determine or control one or more parameters of the wash process, such as whether the starting sump temperature satisfies a target sump temperature, to control a sump dump-and-fill process, and/or to control wash and/or rinse cycle duration to achieve adequate cleaning and sanitization of the wares subject to the cleaning process in accordance with the present disclosure.

After the pre-wash image(s) associated with a cleaning process are classified and the rack volume is determined, the computing device determines the wash cycle time and/or rinse cycle time for the cleaning process based on the associated article type classification and rack volume (310). For example, because drinking glasses are generally less heavily soiled than pots and pans, the wash cycle duration for a cleaning process having an article type classification of "glassware" may be relatively shorter than a wash cycle duration for a cleaning process having an article type classification of "pots and pans." As another example, because more heat energy may be required to achieve satisfactory sanitization of wares in a dish machine when cleaning a full rack as compared to a less full rack, the wash cycle duration and/or rinse cycle duration for a cleaning process having a rack volume classification of "minimally full" or "medium full" may be relatively shorter than a wash cycle duration and/or rinse cycle duration for a cleaning process having a rack volume classification of "full."

In some examples, process (310) may also include identifying when a particular rack is being re-washed. In other words, when a rack that was run through a completed cleaning process is run through a second cleaning process of the cleaning machine. Determining whether articles in a rack associated with a current cleaning process experienced a previous cleaning process may be accomplished by comparing one or more image(s) associated with the current cleaning process to one or more image(s) associated with one or more previous cleaning processes to determine whether the racks of articles represented in the current and previous cleaning processes are the same. For example, the system may compare the article type and rack volume and one or more features of the image(s) with one or more previously cleaned racks to determine if a current rack is a rewashed rack. In some examples, when a rack is rewashed, the articles in the rack are not rearranged, and thus an arrangement of articles in a re-washed rack will match an arrangement of articles in a previous rack. In addition, the amount of sump temperature difference for a re-washed rack may be lower than for non-rewashed racks because the temperature of the rewashed rack has already been raised during a previous cleaning process. In some examples, where the articles in the rewashed rack are rearranged before being rewashed (such as to better expose remaining food soil to the cleaning process), the process may identify rewashed racks based on the article type, rack volume and analysis of the sump temperature difference over the course of the cleaning cycle. One or more cleaning process parameters, such as wash and/or rinse cycle times, may also controlled based on whether the current rack is a rewashed rack.

The system may also determine rewash frequency statistic by determining a the total number of rewashed racks within a specified period of time and comparing that to the total number of racks washed within the specified period of time. The rewash frequency statistic may give managers or other employees of an establishment or group of establishments information concerning the efficiency of the cleaning processes carried out in those establishment(s). For example, a relatively high rewash frequency may need to be further investigated to determine whether rewash of racks is actually necessary based on cleaning process outcomes. At times, employees may rewash racks based on a perception of heavy initial soil on the articles or "just in case" when rewashing of a rack may not be necessary to achieve an adequate cleaning and sanitization result. In such cases, employee training may help to reduce rewash frequency and subsequently increase efficiency in terms of time, water, energy, and cost. Other times, a need to rewash racks may result from one or more failures in the cleaning machine or in other parts of the cleaning process. In any event, the rewash frequency statistic may indicate that some investigation into the reason for a relatively high rewash frequency should take place.

After the cleaning process parameters, such as the wash cycle and/or rinse cycle parameters, are determined, the computing device initiates the cleaning process (312). For example, the computing device may send a command signal to a dish machine (such as dish machine 100 as shown in FIG. 1) to begin the cleaning process using the determined durations of the wash cycle and/or rinse cycle. Alternatively, if the cleaning process has already started, the computing device may adjust the wash cycle and/or rinse cycle parameters based on the article type classification and the rack volume classification associated with the cleaning process. The computing device may further control the wash cycle parameters based on the sump temperature information.

Throughout the course of the wash process (312), the computing device may receive sump temperature information at one or more times throughout the course of the wash process. For example, the computing device may continuously sample the sump temperature information over the course of the wash process. The computing device may also initiate capture of one or more images of the articles in the wash chamber throughout the course of the wash process. For example, one or more images may be periodically captured during execution of the wash process. As another example, one or more images may be captured during the dwell time between the end of the wash cycle and the beginning of the rinse cycle (that is, the time between the wash cycle and the rinse cycle when no cleaning fluid or rinse water is being pump into the wash chamber).

When the cleaning process is complete, the computing device may initiate capture of one or more post-wash images of the racks/wares in the wash chamber of the cleaning machine (314). The computing device may also receive a post-wash sump temperature (315). The post-wash images may be analyzed to determine the soil level remaining on the wares that were exposed to the cleaning process (316). The amount of soil remaining may be compared to one or more thresholds to determine whether the soil was adequately removed (318).

If the soil was adequately removed (318), the computing device may determine the amount of heat energy (as measured in heat unit equivalents, (HUEs) for example) accumulated during the course of the cleaning process (320). For example, the computing device may determine the amount of heat energy based in part on the starting and/or ending sump temperature, the article type, and/or the rack volume. If the accumulated heat energy satisfies a sanitization threshold chosen to ensure satisfactory sanitization of the wares exposed to the cleaning process (322), the cleaning process is complete (324).

If the soil was not adequately removed during the cleaning process (318) the computing device may determine extended wash and/or rinse cycle times needed to complete the cleaning process (326). That is, the computing device may determine extended wash and/or rinse cycle times needed to adequately remove the amount of soil remaining on the wares as determined by analysis of the post-wash image(s). For example, the wash cycle duration may be extended for an amount of time sufficient to adequately clean the amount of soil remaining. The rinse cycle duration may also be extended in order to remove the cleaning solution applied to the wares during the extended wash cycle. The computing device may then control the cleaning machine to automatically execute the extended wash and rinse cycles of the determined durations (336). In this way, process (300) may dynamically control the total duration of the wash cycle(s) (the initial wash cycle(s) duration and the extended wash cycle duration) and the total duration of the rinse cycle(s) (the initial rinse cycle(s) duration and the extended rinse cycle duration) based on analysis of one or more image(s) of articles in the wash chamber of a cleaning machine to ensure that an adequate cleaning result (i.e., adequate soil removal) is achieved.

If the heat energy accumulated over the course of the cleaning process was insufficient to achieve adequate sanitization of the articles (322), the computing device may determine an extended rinse cycle duration needed in order to adequately sanitize the article(s) in the cleaning machine (334). Computing device 200 may then control the cleaning machine to automatically execute the extended rinse cycle of the determined duration (336). In this example, assuming computing device 200 has previously determined based on analysis of the one or more images that the soil was adequately removed from the articles (318), the rinse cycle duration is extended because application of additional hot rinse water during an extended rinse cycle may accomplish the additional heat transfer necessary to satisfy the sanitization threshold. In this way, cleaning process (300) may dynamically control the duration of the rinse cycle based on a calculated amount of heat energy accumulated over the duration of a cleaning process to ensure that an adequate sanitization result is achieved.

In some examples, the ware material itself may affect the wash parameters needed to reach the minimum amount of heat energy in order to achieve adequate sanitization. This may be based at least in part on the heat capacity of the ware material. For example, the cleaning process parameters necessary to achieve adequate sanitization of plastic dishware may be different than the cleaning process parameters necessary to achieve adequate sanitization of ceramic dishware. As another example, the cleaning process parameters necessary to achieve adequate sanitization of plastic eating utensils may be different than the cleaning process parameters necessary to achieve adequate sanitization of metal eating utensils. In accordance with the present disclosure, the heat capacity of the ware material in the cleaning machine may result in a characteristic variation in sump water temperature over the course of a cleaning process. In accordance with the present disclosure, sump water temperatures measured at one or more times during the cleaning process may be used to identify a ware type material, and one or more cleaning process parameters may be dynamically adjusted based on the ware type material to ensure an adequate cleaning and sanitizing result in achieved.

Figure 10:
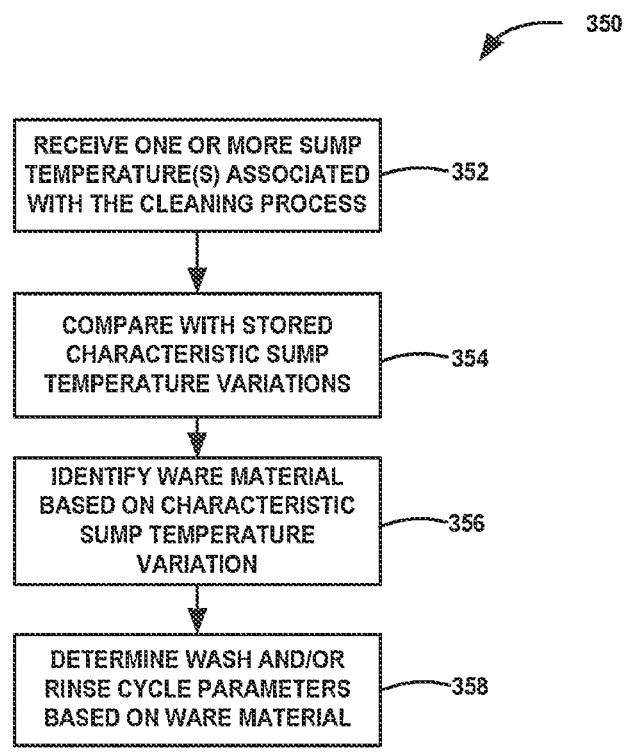
FIG. 10 is a flowchart illustrating another example process by which a computing device controls one or more wash and/or rinse cycles in a cleaning machine based on analysis of sump temperatures in accordance with the present disclosure.

FIG. 10 is a flowchart illustrating another example process (350) by which a computing device controls one or more wash and/or rinse cycles in a cleaning machine based on analysis of sump temperatures in accordance with the present disclosure. The computing device receives temperature information associated with the cleaning solution in the sump (referred to herein as the "sump temperature") associated with a cleaning process (352) at one or more times before, during, and/or after the cleaning process. In some examples, the sump temperature information is received at or near the beginning of a wash process and at or near the end of the wash process to determine an absolute difference in the sump temperature that occurred over the course the cleaning process. As another example, the sump temperature is measured or sampled continuously throughout at least a specified portion of the cleaning process and/or throughout the entire cleaning process.

The computing device analyzes the sump temperature data associated with the cleaning process to identify a characteristic sump temperature variation corresponding to a particular ware material (354). For example, the sump temperature information may be compared to a plurality of stored characteristic sump temperature variations (stored in, for example, data storage 210 as shown in FIG. 2). Each of the plurality of stored characteristic sump temperature variations may correspond to a different one of a plurality of article type/ware material combinations. Example combinations of article type/ware material may include glassware/glass, glassware/plastic, dishware/ceramic, dishware/plastic, silverware/metal, silverware/plastic, pots/pans/metal, pots/pans/glass, etc. Each of these combinations may be associated with a different characteristic sump temperature variation that, when identified may be used to identify the ware material, and thus to control one or more parameters of an associated cleaning process.

In some examples, the characteristic sump temperature variation may include an absolute difference in the sump temperature as measured from the start of the cleaning process to the end the cleaning process. In other examples, the characteristic sump temperature variation may include a specified rate of change of the sump temperature (e.g., the slope or the derivative of the sump temperature vs. time curve) as measured at one or more points in time during the cleaning process. In other examples, the characteristic sump temperature variation may include a sump temperature profile (e.g., a "shape" of the temperature vs. time curve) of the sump temperatures measured from the beginning to the end of the cleaning process, or during a specified portion of the cleaning process.

Once the characteristic temperature variation associated with the cleaning process is identified, the computing device may identify the ware material based on the characteristic temperature variation (356). The computing device may then control one or more wash or rinse cycle parameters based on the ware material to arrive at a cleaning process sufficient to adequately clean and/or sanitize the wares in the wash chamber of the cleaning machine (358).

For example, the wash and/or rinse cycle times may be different for different ware materials. For example, wash and/or rinse cycle times for plastic dishware may be different than wash and/or rinse cycle times for ceramic dishware, both in terms of ensuring adequate soil removal on the dishware and in terms of ensuring adequate sanitization of the dishware. Similarly, wash and/or rinse cycle times for plastic silverware may be different than wash and/or rinse cycle times for metal silverware, both in terms of ensuring adequate soil removal on the dishware and in terms of ensuring adequate sanitization of the dishware.

Analysis of the sump temperature information associated with a cleaning process may be used alone or in combination with analysis of one or more images associated with the cleaning process. When used alone, the sump temperature information may be used to identify a ware type and a ware material, and this information may be used to control one or more parameters of an associated cleaning process. When used in combination with image analysis, the sump temperature information may be used to confirm an article type classification and to identify a corresponding ware material. Alternatively, the results of image analysis may be used to confirm an article type as determined by analysis of the sump temperature information, or used in combination with analysis of the sump temperature information to identify a characteristic sump temperature variation, and thus to identify a ware type.

Although the examples presented herein are described with respect to automated cleaning machines for use in food preparation/processing applications (e.g., dish machines or ware wash machines), it shall be understood that the cleaning process verification techniques described herein may be applied to a variety of other applications. Such applications may include, for example, food and/or beverage processing equipment, laundry applications, agricultural applications, hospitality applications, and/or any other application in which cleaning, disinfecting, or sanitizing of articles may be useful.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

EXAMPLES

Example 1. A system comprising at least one imaging device that captures a pre-wash image of articles to be cleaned by an associated cleaning process in a wash chamber of a cleaning machine; at least one processor; and a storage device comprising instructions executable by the at least one processor to analyze the pre-wash image to classify the articles as belonging to one of a plurality of article types; and determine one or more parameters for the associated cleaning process based on the classified one of the plurality of article types.

Example 2. The system of Example 1 wherein the cleaning machine is an automated dishmachine and the plurality of article types includes a dishware type, a glassware type, a silverware type, a pots/pans type, and a mixed wares type.

Example 3. The system of Example 1 wherein the one or more parameters for the associated cleaning process includes at least one of a wash cycle duration and a rinse cycle duration.

Example 4. The system of Example 1 wherein the at least one imaging device further captures a post-wash image of the articles after completion of the associated cleaning process, and wherein the storage device further comprises instructions executable by the at least one processor to analyze the post-wash image to determine an amount of soil remaining on the articles after completion of the wash process; determine an extended wash cycle time for the associated cleaning process based on the amount of soil remaining; and initiate execution of an extended wash cycle by the cleaning machine having a wash cycle duration corresponding to the extended wash cycle time.

Example 5. The system of Example 4 wherein the storage device comprising instructions executable by the at least one processor to determine an extended rinse cycle time for the associated cleaning process based on the amount of soil remaining; and initiate execution of the extended wash cycle by the cleaning machine having a wash cycle duration corresponding to the extended wash cycle time and a rinse cycle duration corresponding to the extended rinse cycle time.

Example 6. The system of Example 1 wherein the storage device further includes instructions executable by the at least one processor to analyze the pre-wash image to assign one of a plurality of rack volumes corresponding to a relative fullness of a rack on which the articles are supported in the wash chamber; and determine the one or more parameters for the associated cleaning process based on the assigned one of the plurality of rack volumes.

Example 7. The system of Example 6 wherein the storage device further includes instructions executable by the at least one processor to initiate a wash cycle of the cleaning machine having a wash cycle duration setting based on the classified one of the plurality of article types and the assigned rack volume.

Example 8. The system of Example 6 wherein the storage device further stores one or more characteristic sump temperature variations, each characteristic sump temperature variation corresponding to a different one of a plurality of ware materials.

Example 9. The system of Example 8 wherein the storage device further includes instructions executable by the at least one processor to receive sump temperature information throughout a specified portion of the cleaning process; compare the received sump temperature information with the one or more stored characteristic sump temperature variations; identify a corresponding one of the plurality of ware materials based on the comparison; and determine the one or more wash cycle parameters based on the identified one of the plurality of ware materials.

Example 10. The system of Example 1 wherein the storage device further comprises instructions executable by the at least one processor to analyze a post-wash image of the articles to determine whether the articles are represented in one or more images associated with a previous cleaning process.

Example 11. A method comprising: capturing, by an imaging device, a pre-wash image of articles to be cleaned by an associated cleaning process in a wash chamber of a cleaning machine; analyzing the pre-wash image to classify the articles as belonging to one of a plurality of article types; and determining one or more parameters for the associated cleaning process based on the classified one of the plurality of article types.

Example 12. The method of Example 11 wherein the cleaning machine is an automated dishmachine and wherein the plurality of article types includes a dishware type, a glassware type, a silverware type, a pots/pans type, and a mixed wares type.

Example 13. The method of Example 12 wherein the one or more parameters for the associated cleaning process includes at least one of a wash cycle duration and a rinse cycle duration.

Example 14. The method of Example 11 further comprising: capturing, by the imaging device, a post-wash image of the articles after completion of the associated cleaning process; analyzing the post-wash image to determine an amount of soil remaining on the articles after completion of the wash process; determining an extended wash cycle time for the associated cleaning process based on the amount of soil remaining; and initiating execution of an extended wash cycle by the cleaning machine having a wash cycle duration corresponding to the extended wash cycle time.

Example 15. The method of Example 14 further comprising: determining an extended rinse cycle time for the associated cleaning process based on the amount of soil remaining; and initiating execution of the extended wash cycle by the cleaning machine having a wash cycle duration corresponding to the extended wash cycle time and a rinse cycle duration corresponding to the extended rinse cycle time.

Example 16. The method of Example 11 further comprising: analyzing the pre-wash image to assign one of a plurality of rack volumes corresponding to a relative fullness of a rack on which the articles are supported in the wash chamber; and determining the one or more parameters for the associated cleaning process based on the assigned one of the plurality of rack volumes.

Example 17. The method of Example 16 further comprising initiating a wash cycle of the cleaning machine having a wash cycle duration setting based on the classified one of the plurality of article types and the assigned rack volume.

Example 18. The method of Example 16 further comprising storing one or more characteristic sump temperature variations, each characteristic sump temperature variation corresponding to a different one of a plurality of ware materials.

Example 19. The method of Example 18 further comprising: receiving sump temperature information throughout a specified portion of the cleaning process; comparing the received sump temperature information with the one or more stored characteristic sump temperature variations; identifying a corresponding one of the plurality of ware materials based on the comparison; and determining the one or more wash cycle parameters based on the identified one of the plurality of ware materials.

Example 20. A system configured to control a cleaning process for cleaning articles in the wash chamber of a cleaning machine, the articles comprising one of a plurality of ware materials, comprising: at least one processor; and a storage device comprising one or more characteristic sump temperature variations, each characteristic sump temperature variation corresponding to a different one of the plurality of ware materials, the storage device further comprising instructions executable by the at least one processor to: receive sump temperature information at one or more specified times during the cleaning process; compare the received sump temperature information with the one or more stored characteristic sump temperature variations; identify one of the plurality of ware materials corresponding to the articles based on the comparison; and control one or more wash cycle parameters for the cleaning machine based on the identified one of the plurality of ware materials.

Example 21. The system of Example 20 wherein the cleaning machine is an automated dishmachine and the plurality of ware materials includes ceramic, metal, plastic, and glass.

Example 22. The system of Example 20 wherein the one or more parameters for the associated cleaning process includes at least one of a wash cycle duration and a rinse cycle duration.

Example 23. The system of Example 20 further comprising: at least one imaging device that captures a pre-wash image of the articles; the storage device further comprising instructions executable by the at least one processor to analyze the pre-wash image to classify the articles as belonging to one of a plurality of article types; and control the one or more parameters for the cleaning process based on the classified one of the plurality of article types and the ware material.

Example 24. The system of Example 23 wherein the cleaning machine is an automated dishmachine and the plurality of article types includes a dishware type, a glassware type, a silverware type, a pots/pans type, and a mixed wares type.

Various examples have been described. These and other examples are within the scope of the following claims.

The invention claimed is:

1. A system comprising:
an imaging device configured to:
capture a first image of first articles that are in a wash chamber of a cleaning machine for cleaning while the first articles are in the wash chamber for a first cleaning process performed by the cleaning machine; and
capture a second image of second articles that are in the wash chamber of the cleaning machine for cleaning while the second articles are in the wash chamber for a second cleaning process performed by the cleaning machine;
a sump temperature sensor configured to measure a temperature of a solution in a sump of the cleaning machine; and
a computing device comprising at least one processor configured to:
determine that a rack in the wash chamber is a rewashed rack, wherein the at least one processor is configured to determine that the rack is the rewashed rack based on: (i) a comparison of the first image and the second image to determine whether the second articles are identical to the first articles, wherein, as part of determining whether the second articles are identical to the first articles, the at least one processor determines based on the first image and the second image whether the first articles and the second articles are rearranged within the rack and (ii) based on a sump temperature difference for the second cleaning process being less than a sump temperature difference for the first cleaning process, wherein the sump temperature difference for the second cleaning process is a difference between a first and a second temperature of solution in the sump measured by the sump temperature sensor during the second cleaning process, and the sump temperature difference for the first cleaning process is a difference between a third and a fourth temperature of solution in the sump measured by the sump temperature sensor during the first cleaning process; and
adjust, based on the determination that the rack is a rewashed rack, one or more of a wash cycle time or a rinse cycle time performed by the cleaning machine during execution of the second cleaning process.

2. The system of claim 1, wherein the at least one processor is further configured to determine a rewash frequency statistic based on a total number of rewashed racks within a specified period of time and a total number of racks washed within the specified period of time.

3. The system of claim 1, wherein:
the at least one processor is configured to, as part of determining that the rack is the rewashed rack:
compare at least one of an article type or a rack volume determined for the second cleaning process with at least one of an article type or a rack volume, respectively, determined for the first cleaning process; and
determine that the second articles are identical to the first articles based on the comparison of the at least one the article type or the rack volume determined for the second cleaning process with at least one of the article type or the rack volume, respectively, determined for the first cleaning process.

4. The system of claim 1, wherein:
the at least one processor is configured to determine that the rack is the rewashed rack based on one or more of an article type or rack volume over a course of the first cleaning process and the second cleaning process.

5. The system of claim 1, wherein the imaging device is configured to capture the first image before a start of the first cleaning process and to capture the second image before a start of the second cleaning process.

6. The system of claim 1, wherein:
the imaging device is configured to capture the first image during a dwell time between a wash cycle and a rinse cycle of the first cleaning process, and
the imaging device is configured to capture the second image during a dwell time between a wash cycle and a rinse cycle of the second cleaning process.

7. The system of claim 1, wherein:
the imaging device is configured to capture the first image after completion of the first cleaning process, and
the imaging device is configured to capture the second image before a start of the second cleaning process.

8. A method comprising:
- capturing a first image of first articles that are in a wash chamber of a cleaning machine for cleaning while the first articles are in the wash chamber for a first cleaning process performed by the cleaning machine;
- capturing a second image of second articles that are in the wash chamber of the cleaning machine for cleaning while the second articles are in the wash chamber for a second cleaning process performed by the cleaning machine;
- determining, by at least one processor of a computing device, that a rack in the wash chamber is a rewashed rack, wherein determining that the rack is the rewashed rack comprises determining that the rack is the rewashed rack based on: (1) a comparison of the first image and the second image to determine whether the second articles are identical to the first articles, wherein, determining whether the second articles are identical to the first articles comprises determining based on the first image and the second image whether the first articles and the second articles are rearranged within the rack and (ii) a sump temperature difference for the second cleaning process being less than a sump temperature difference for the first cleaning process, wherein the sump temperature difference for the second cleaning process is a difference between a first and a second temperature of a solution in a sump of the cleaning machine measured by a sump temperature sensor during the second cleaning process, and the sump temperature difference for the first cleaning process is a difference between a third and a fourth temperature of solution in the sump measured by the sump temperature sensor during the first cleaning process;
- adjusting, by the at least one processor, based on the determination that the rack is the rewashed rack, one or more of a wash cycle time or a rinse cycle time performed by the cleaning machine during execution of the second cleaning process.

9. The method of claim 8, further comprising determining, by the at least one processor, a rewash frequency statistic based on a total number of rewashed racks within a specified period time and a total number of racks washed within the specified period of time.

10. The method of claim 8, further comprising:
- comparing, by the at least one processor, at least one of an article type or a rack volume determined for the second cleaning process with at least one of an article type or a rack volume, respectively, determined for the first cleaning process; and
- determining, by the at least one processor, whether the second articles are identical to the first articles based on the comparison of the at least one the article type or the rack volume determined for the second cleaning process with at least one of the article type or the rack volume, respectively, determined for the first cleaning process.

11. The method of claim 8, further comprising initiating, by the at least one processor, the second cleaning process after adjusting at least one of the wash cycle time or the rinse cycle time for the second cleaning process.

12. The method of claim 8, wherein:
- the method further comprises: determining, by the at least one processor, that the rack is the rewashed rack based on one or more of an article type or rack volume over a course of the first cleaning process and the second cleaning process.

13. The method of claim 8, wherein the first image is captured before a start of the first cleaning process and the second image is captured before a start of the second cleaning process.

14. The method of claim 8, wherein:
- the first image is captured during a dwell time between a wash cycle and a rinse cycle of the first cleaning process, and
- the second image is captured during a dwell time between a wash cycle and a rinse cycle of the second cleaning process.

15. The method of claim 8, wherein:
- the first image is captured after completion of the first cleaning process, and
- the second image is captured before a start of the second cleaning process.

* * * * *